(12) United States Patent
Yamashita et al.

(10) Patent No.: US 7,295,814 B2
(45) Date of Patent: Nov. 13, 2007

(54) ANTENNA SWITCH CIRCUIT AND ANTENNA SWITCH MODULE

(75) Inventors: Takahiro Yamashita, Saitama-ken (JP); Keisuke Fukamachi, Saitama-ken (JP); Shigeru Kemmochi, Saitama-ken (JP)

(73) Assignee: Hitachi Metals, Ltd., Tokyo (JP)

( * ) Notice: Subject to any disclaimer, the term of this patent is extended or adjusted under 35 U.S.C. 154(b) by 492 days.

(21) Appl. No.: 10/770,569

(22) Filed: Feb. 4, 2004

(65) Prior Publication Data

US 2004/0217914 A1 Nov. 4, 2004

(30) Foreign Application Priority Data

Feb. 5, 2003 (JP) ............................. 2003-028430
Sep. 26, 2003 (JP) ............................. 2003-335283

(51) Int. Cl.
H04B 1/44 (2006.01)
H04B 1/46 (2006.01)
H03H 7/46 (2006.01)
H03H 7/48 (2006.01)

(52) U.S. Cl. .................. 455/83; 455/552.1; 455/553.1; 455/78; 455/82; 333/132

(58) Field of Classification Search ............. 455/552.1, 455/553.1, 78, 82, 83; 133/132; 333/132
See application file for complete search history.

(56) References Cited

U.S. PATENT DOCUMENTS

| 5,852,784 | A | 12/1998 | Ito et al. |
| 5,966,646 | A | 10/1999 | Lampe et al. |
| 6,011,450 | A * | 1/2000 | Miya .......................... 333/103 |
| 6,249,190 | B1 * | 6/2001 | Rozenblit et al. ........... 455/262 |
| 6,606,015 | B2 * | 8/2003 | Uriu et al. ................... 333/132 |
| 6,633,748 | B1 * | 10/2003 | Watanabe et al. ............. 455/78 |
| 6,999,786 | B2 * | 2/2006 | Iida .......................... 455/550.1 |
| 7,027,777 | B2 * | 4/2006 | Uriu et al. ..................... 455/78 |

(Continued)

FOREIGN PATENT DOCUMENTS

| EP | 1 168 650 A1 | 1/2002 |
| EP | 1 265 370 A1 | 12/2002 |
| EP | 1 265 370 A1 | 12/2003 |
| WO | WO 02/01741 A1 | 1/2002 |
| WO | WO 02/080388 A2 | 10/2002 |

*Primary Examiner*—Matthew Anderson
*Assistant Examiner*—Wen Huang
(74) *Attorney, Agent, or Firm*—Sughrue Mion Pllc.

(57) ABSTRACT

An antenna switch module connected to a common antenna for switching the connection of the antenna to a transmission circuit or a receiving circuit in plural transmitting/receiving systems having different passbands, comprising a diplexer circuit comprising a low-pass filter and a high-pass filter; a first switch circuit connected to the low-pass filter and for switching a transmitting line and a receiving line, a second switch circuit connected to the high-pass filter for switching a transmitting line and a receiving line; a third switch circuit connected to the first switch circuit for switching the receiving line from the first switch circuit; and a fourth switch circuit connected to the second switch circuit for switching the receiving line from the second switch circuit; at least part of transmission lines constituting LC circuits in the diplexer circuit and the first and second switch circuits being electrode patterns formed in a multilayer substrate constituted by plural dielectric layers; and chip elements constituting part of the LC circuits, diode elements constituting the first and second switch circuits, and semiconductor elements constituting the third and fourth switch circuits being mounted onto the multilayer substrate.

11 Claims, 15 Drawing Sheets

U.S. PATENT DOCUMENTS

| | | |
|---|---|---|
| 7,031,748 B2* | 4/2006 | Takagi ..................... 455/553.1 |
| 2002/0032038 A1* | 3/2002 | Furutani et al. ............ 455/552 |
| 2002/0090974 A1* | 7/2002 | Hagn ........................ 455/552 |
| 2002/0183016 A1* | 12/2002 | Kemmochi et al. ........... 455/83 |
| 2003/0189910 A1* | 10/2003 | Yamada et al. ............. 370/335 |
| 2005/0048927 A1* | 3/2005 | Kemmochi et al. ........... 455/78 |

* cited by examiner

GSM850/EGSM-TX→ANT
Transmission Mode

ANTENNA SWITCH CIRCUIT AND ANTENNA SWITCH MODULE

FIELD OF THE INVENTION

The present invention relates to an antenna switch circuit for switching signal paths of at least three frequency bands connected to a common antenna in a multiband mobile phone system adapted for different frequency bands such as GSM850, EGSM, DCS and PCS, and an antenna switch module comprising a plurality of such antenna switch circuits formed in a laminate.

BACKGROUND OF THE INVENTION

Because of rapid development of mobile phones, etc. worldwide, mobile phones utilizing plural frequency bands and plural communications systems have been put into practical use. Because they should be operated as multiband terminals adapted for different frequency bands and communications systems, they have complicated circuits, resulting in increase in the number of parts and their size and cost. Accordingly, the reduction of the number of parts and the sharing of parts are actively pursued by circuit integration.

Because the sharing of a particularly large antenna greatly contributes to the miniaturization of terminals, it is important to develop a small antenna switch circuit capable of switching one antenna between plural bands.

Practically used in Europe as a universal mobile telecommunications system (UMTS) are triple-band mobile phones adapted for an extended global system for mobile communications (EGSM) of a 900 MHz band, a digital communication system (DCS) of a 1.8 GHz band, and a wideband code division multiple access (WCDMA) of a 2 GHz band.

For instance, EP1265370 (JP 2002-246942 A) discloses an antenna switch circuit capable of switching one antenna between three bands. In this antenna switch circuit, a first high-frequency switch comprises a pin-junction diode as a switching element to switch a GSM transmitting path and a GSM receiving path, and a second high-frequency switch comprises three sets of serially connected field effect transistors (FETs) as switching elements to switch a WCDMA transmitting/receiving path, a DCS transmitting path and a DCS receiving path.

These antenna switch circuits are generally supported by multilayer substrates. The multilayer substrate is obtained by printing an electrode material comprising silver or copper as a main component onto each ceramic sheet to form electrode patterns for transmission lines and capacitors for constituting the circuit, laminating these sheets, and sintering the resultant laminate. Switching elements such as pin-junction diodes, FET switches, etc. are usually mounted onto the upper surface of the multilayer substrate.

The circuit disclosed in EP1265370, however, fails to achieve an antenna switch applied to worldwide usable multiband mobile phones for four bands or more including not only EGSM and DCS, but also 850-MHz-band GSM850 (global system for mobile communications 850) and 1.9-GHz-band PCS (personal communication system) practically used in the U.S. This is because a GaAs-FET switch of SP6T as shown in FIG. 18 should be used when an antenna switch circuit adapted for four bands is constituted by using the GaAs-FET switch. Because the SP6T switch is generally larger and more expensive than conventional SPDT or SP3T, it is disadvantageous in the miniaturization and cost reduction of an antenna switch circuit. In addition, the control of the SP6T switch needs 6 or 7 control terminals, resulting in increase in the number of terminals in a module.

Multilayer substrates comprising FET switches are poor in isolation between transmitting paths and receiving paths. In the case of the GaAs-FET switch circuit shown in FIG. 18, isolation between transmission and receiving is only about 25 dB, needing improvement in a circuit structure for improved isolation characteristics. This results in a larger chip size of the GaAs-FET switch, and difficulty in miniaturization and cost increase. Because isolation characteristics between transmitting paths and receiving paths are affected by the interference of electrode patterns in the multilayer substrate, etc., the influence of the arrangement of electrodes, etc. in the multilayer substrate should be taken into consideration for the miniaturization of the module. However, EP1265370 fails to teach how the miniaturization and cost reduction of an antenna switch module, the improvement of isolation, electrode arrangement in the multilayer substrate, etc. should be achieved.

OBJECT OF THE INVENTION

Accordingly, an object of the present invention is to provide a multiband antenna switch circuit adapted for three bands or more such as EGSM (GSM850), DCS, PCS, etc., which can be miniaturized by extremely reducing the number of control terminals.

Another object of the present invention is to provide a small laminate-type antenna switch module with high isolation between transmission and receiving and a low insertion loss.

SUMMARY OF THE INVENTION

The first antenna switch circuit according to the present invention is connected to a common antenna for switching the connection of the antenna to transmission circuits or receiving circuits in plural transmitting/receiving systems having different passbands, comprising a diplexer circuit comprising a low-pass filter and a high-pass filter;

a first switch circuit connected to the low-pass filter and comprising diodes, transmission lines and at least one capacitor for switching a transmitting path and a receiving path;

a second switch circuit connected to the high-pass filter and comprising diodes, transmission lines and at least one capacitor for switching a transmitting path and a receiving path; and a fourth switch circuit connected to the second switch circuit and comprising a semiconductor element for switching the receiving path from the second switch circuit.

The first antenna switch circuit preferably further comprises a capacitor between the second switch circuit and the fourth switch circuit. The capacitor preferably has an electrostatic capacitance of 5 pF or more.

In the first antenna switch circuit, the first switch circuit switches a transmitting path and a receiving path of EGSM or GSM850; the second switch circuit switches a transmitting path and a receiving path of DCS and PCS; the fourth switch circuit switches a receiving path of DCS and a receiving path of PCS; and the fourth switch circuit is connected to the receiving path of PCS at the time of transmission of DCS and PCS.

The second antenna switch circuit according to the present invention is connected to a common antenna for switching the connection of the antenna to a transmission circuit or a receiving circuit in plural transmitting/receiving systems having different passbands, comprising a diplexer circuit comprising a low-pass filter and a high-pass filter;

a first switch circuit connected to the low-pass filter and comprising diodes, transmission lines and at least one capacitor for switching a transmitting path and a receiving path;

a second switch circuit connected to the high-pass filter and comprising diodes, transmission lines and at least one capacitor for switching a transmitting path and a receiving path;

a third switch circuit connected to the first switch circuit and comprising a semiconductor element for switching the receiving path from the first switch circuit; and a fourth switch circuit connected to the second switch circuit and comprising a semiconductor element for switching the receiving path from the second switch circuit.

The second antenna switch circuit preferably further comprises capacitors between the first switch circuit and the third switch circuit, and between the second switch circuit and the fourth switch circuit. The capacitors preferably have an electrostatic capacitance of 5 pF or more.

In the second antenna switch circuit, a high-pass filter is preferably disposed between the first and third switch circuits and/or between the second and fourth switch circuits. The third and fourth switch circuits preferably share a control power terminal. Switching means used in the third and fourth switch circuits are preferably FET switches.

In the second antenna switch circuit, the first switch circuit switches the transmitting path and the receiving path of GSM850 and EGSM; the second switch circuit switches the transmitting path and the receiving path of DCS and PCS; the third switch circuit switches a receiving path of GSM850 and a receiving path of EGSM; the fourth switch circuit switches the receiving path of DCS and the receiving path of PCS; the third switch circuit is connected to the receiving path of EGSM at the time of transmission of GSM850 and EGSM; and the fourth switch circuit is connected to the receiving path of PCS at the time of transmission of DCS and PCS.

The antenna switch module according to the present invention is connected to a common antenna for switching the connection of the antenna to a transmission circuit or a receiving circuit in plural transmitting/receiving systems having different passbands, comprising a diplexer circuit comprising a low-pass filter and a high-pass filter each constituted by an LC circuit;

a first switch circuit connected to the low-pass filter and comprising diodes and transmission lines for switching a transmitting path and a receiving path, a second switch circuit connected to the high-pass filter and comprising diodes and transmission lines for switching a transmitting path and a receiving path;

a third switch circuit connected to the first switch circuit and comprising a semiconductor element for switching the receiving path from the first switch circuit; and a fourth switch circuit connected to the second switch circuit and comprising a semiconductor element for switching the receiving path from the second switch circuit;

at least part of transmission lines constituting the LC circuits in the diplexer circuit and the first and second switch circuits being electrode patterns formed in a multilayer substrate constituted by plural dielectric layers; and chip elements constituting part of the LC circuits, diode elements constituting the first and second switch circuits, and semiconductor elements constituting the third and fourth switch circuits being mounted onto the multilayer substrate.

In the antenna switch module, semiconductor elements constituting the third switch circuit and/or the fourth switch circuit preferably overlap at least part of electrode patterns constituting the transmission lines on the side of the receiving path of the first or second switch circuit, when the multilayer substrate is viewed from above its mount surface in a lamination direction.

In the antenna switch module, a layer having a ground electrode is preferably disposed between layers having the semiconductor elements and electrode patterns constituting transmission lines on the side of the receiving paths. Low-pass filter circuits constituted by LC circuits formed by electrode patterns in the multilayer substrate are preferably disposed in the first and second switch circuits on the side of the transmitting paths. A high-pass filter constituted by an LC circuit formed by an electrode pattern in the multilayer substrate is preferably disposed between the first and third switch circuits and/or between the second and fourth switch circuits.

In the antenna switch module, switching means constituting the first and second switch circuits mounted onto the multilayer substrate are preferably pin-junction diodes, and switching means constituting the third and fourth switch circuits are FET switches.

The communications device according to the present invention comprises either of the first and second antenna switch circuits.

DETAILED DESCRIPTION OF THE PREFERRED EMBODIMENTS

[1] Structure of Antenna Switch Circuit

Figure 1:
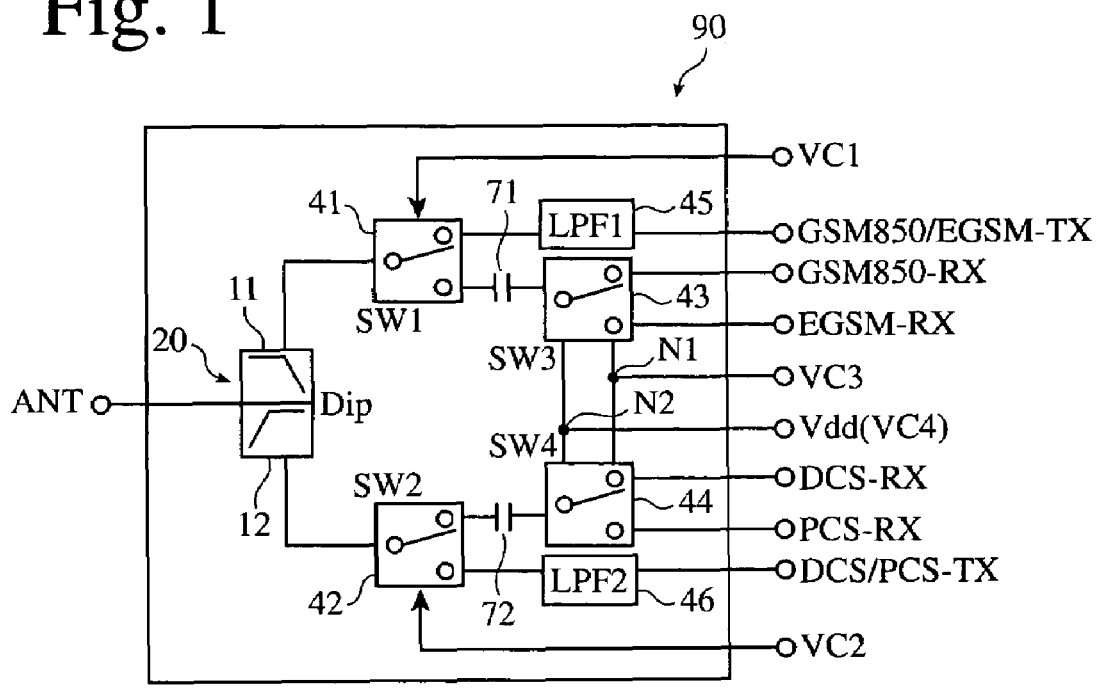
FIG. 1 is a block diagram showing the antenna switch circuit according to one embodiment of the present invention.

FIG. 1 is a block diagram showing the antenna switch circuit according to one embodiment of the present invention. In this embodiment, a first transmitting/receiving system handles a signal for GSM850 (transmission frequency: 824 to 849 MHz, receiving frequency: 869 to 894 MHz), a second transmitting/receiving system handles a signal for EGSM (transmission frequency: 880 to 915 MHz, receiving frequency: 925 to 960 MHz), a third transmitting/receiving system handles a signal for DCS (transmission frequency 1710 to 1785 MHz, receiving frequency: 1805 to 1880 MHz), and a fourth transmitting/receiving system handles a signal for PCS (transmission frequency: 1850 to 1910 MHz, receiving frequency 1930 to 1990 MHz). An antenna switch circuit comprises a function of properly switching the connection of a GSM850/EGSM transmitting path, a GSM850 receiving path, an EGSM receiving path, a DCS/PCS transmitting path, a DCS receiving path and a PCS receiving path to an antenna.

Its operation at the time of receiving will be explained as an example. A received signal is first divided by a diplexer (Dip) 20 to a low-frequency band signal of GSM850 or EGSM and a high-frequency band signal of DCS or PCS. Lower-frequency receiving signals pass through a first switch circuit (SW1) 41 to a third switch circuit (SW3) 43, in which they are switched to a receiving path of GSM850 or EGSM. Higher-frequency receiving signals pass through a second switch circuit (SW2) 42 to a fourth switch circuit (SW4) 44, in which they are switched to a receiving path of DCS or PCS.

In FIG. 1, capacitors 71, 72 are DC-blocking capacitors for separating a control voltage of each of the switches SW1, SW2, SW3 and SW4. The electrostatic capacitance of the capacitors 71, 72 is preferably 5 pF or more. When the electrostatic capacitance is less than 5 pF, there is a large insertion loss at frequencies of the receiving signals. When DC-blocking capacitors of less than 5 pF are actually used at a pass frequency of 900 MHz, the insertion loss is deteriorated by 0.5 dB. The capacitors 71, 72 may be formed between electrode patterns on the laminate substrates. In this case, because capacitors need not be mounted, it is possible to omit the cost of mounting parts.

[2] Switching Elements

The antenna switch circuit of the present invention comprises first and second switch circuits SW1 and SW2 comprising pin-junction diodes, through which transmission and receiving signals pass. The pin-junction diode switches are better in distortion and power resistance at the time of power input than GaAs-FET switches. In addition, because the pin-junction diodes are in an OFF state at the time of receiving, power consumption can be extremely reduced at the time of receiving. The switching of receiving paths, through which as small current as about 0.2 mA flows, is conducted by the third and fourth switch circuits SW3 and SW4 each comprising a GaAs-FET switch. Because the GaAs-FET switch consumes little current in an ON state and need not have a λ/4 transmission line, a resistor, etc. indispensable for the diode switch, it provides the multilayer substrate with a simple design, enabling the further miniaturization of a module. The GaAs-FET is turned on by making a bias voltage applied to a gate terminal of FET sufficiently higher than a pinch-off voltage to make impedance between a drain and a source low, and turned off by making the bias voltage sufficiently lower than the pinch-off voltage to make impedance between a drain and a source high. The GaAs-FET thus functions as a switch. In the present invention, a single pole dual throw switch (SPDT) is preferably used.

The pin-junction diode switch comprises a pin-junction diode as a switching element. The pin-junction diode is turned on by applying a forward bias voltage to lower impedance to several ohms, while it is in an OFF state when the bias is not applied. Utilizing this on/off function and a resonance circuit, etc. by λ/4 transmission lines, the pin-junction diode switch can switch the connection of an antenna to a transmitting path or a receiving path.

Each of the first and second switch circuits SW1 and SW2 shown in FIG. 1 uses a pin-junction diode as a switching element. The switching of signal paths of SW1 and SW2 is conducted by control terminals VC1, VC2, respectively.

In the third and fourth switch circuits SW3, SW4, FET (field-effect transistor), particularly GaAs-FET, is preferably used as a switching element. The control of SW3, SW4 is conducted by a common control terminal VC3.

In the present invention, a four-band antenna switch comprises pin-junction diode switches SW1, SW2 and GaAs-FET switches SW3, SW4 as switching elements. In this structure, high-power signals pass through the pin-junction diode switches having excellent power resistance characteristics at the time of transmission, generating no distortion in transmitted signals. The GaAs-FET switches are used as switches in receiving paths for small signals, causing no problem in power resistance inherent in GaAs-FET. When the pin junction diode switches are used on the receiving side, λ/4 transmission lines, resistors, etc. are needed. However, the use of the GaAs-FET switches on the receiving side makes it possible to omit these elements, achieving the miniaturization of the antenna switch circuit.

A Vdd terminal is a power terminal functioning as a power supply for applying a constant voltage to drive the GaAs-FET switches. Accordingly, the operation of the antenna switch is controlled only by the combinations of ON/OFF (logic) in three control terminals VC1 to VC3, thereby making it possible to drastically reduce the number of control terminals from 6 to 7 control terminals in the conventional SP6T.

In another embodiment, the control power terminal VC4 is used in place of the terminal Vdd shown in FIG. 1 to control the GaAs-FET switches SW3, SW4. The feature of this embodiment is that though four control terminals VC1 to VC4 are needed, power supplies for driving the GaAs-FET switches are not needed, enabling the miniaturization of the GaAs-FET switches and thus cost reduction. Of course, this embodiment is advantageous in the number of control terminals, as compared with 6 to 7 control terminals in the conventional SP6T.

An important difference of the antenna switch circuit of the present invention from the conventional antenna switch circuit is that the control terminal VC3 and the power terminal Vdd or the control terminals VC3, VC4 are replaced by one part, needing only four control (power supply) terminals including the control terminals VC1, VC2 of the pin-junction diode switches SW1, SW2. Sharing the control terminals VC3, Vdd (VC4) is achieved by the GaAs-FET switch constituted by SPDT. As compared with 6 or 7 control terminals needed in the conventional SP6T switch, the present invention has made it possible to omit 2 or 3 control terminals, advantageous for the antenna switch circuit requiring further increased performance and miniaturization together with the above power resistance characteristics. The reduction of the number of terminals by sharing control terminals provides not only the miniaturization of the antenna switch module, but also the simplification of a control logic of the multiband antenna switch module for three bands or more.

[3] One Specific Example of Antenna Switch Circuit

Figure 5:
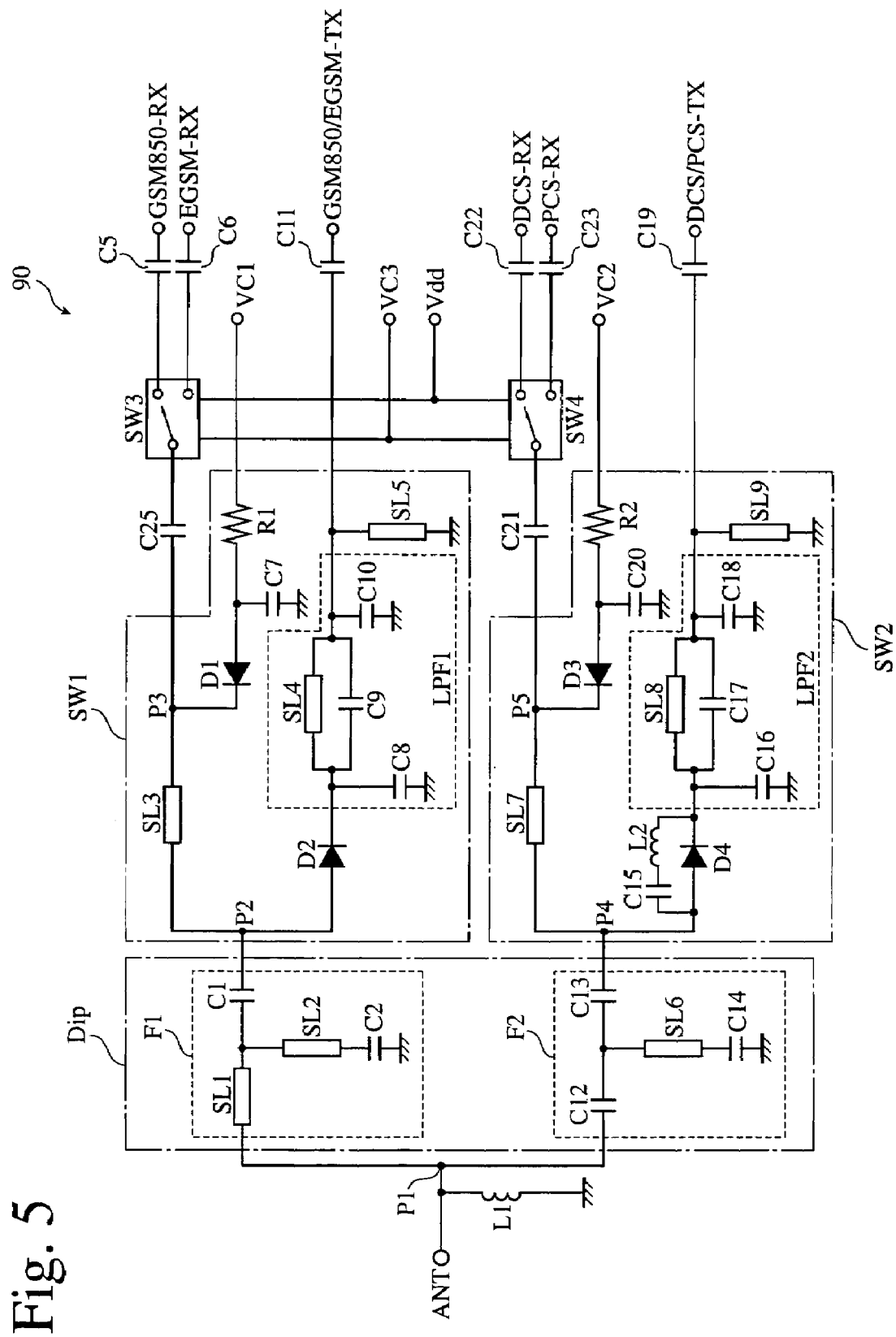
FIG. 5 is a view showing an equivalent circuit of the antenna switch circuit according to one embodiment of the present invention.

FIG. 5 shows one specific example of the equivalent circuit of the antenna switch circuit of the present invention. In FIG. 5, the antenna terminal ANT is grounded via an inductor L1 for preventing electrostatic problems, and branched at a connection point P1 to receiving circuits of GSM850 and EGSM, and receiving circuits of DCS and PCS.

The diplexer circuit 20 shown in FIG. 1 is constituted by the first and second filter circuits F1 and F2 connected to the antenna terminal ANT. The first filter circuit F1 is a low-pass filter constituted by transmission lines SL1, SL2 and capacitors C1, C2 for permitting lower-frequency signals of GSM850 and EGSM to pass through. The second filter circuit F2 is a high-pass filter constituted by a transmission line SL6 and capacitors C12 to C14 for permitting higher-frequency signals of DCS and PCS to pass through.

In FIG. 5, the first switch (SW1) 41 shown in FIG. 1 is constituted by pin-junction diodes D1, D2, λ/4 transmission lines SL3, SL5, a capacitor C7, and a resistor R1. The switching of transmitting paths and receiving paths of GSM850 and EGSM can be conducted by ON/OFF of the control terminal VC1. The low-pass filter (LPF1) 45 shown in FIG. 1 is constituted by a transmission line SL4 and capacitors C8 to C10. A parallel resonance frequency of SL4 and C9 is set at about 2 to 3 times the transmission frequencies of GSM850/EGSM, resulting in the attenuation of harmonic distortion from a power amplifier connected to the transmission terminal of GSM850/EGSM.

In FIG. 5, the second switch (SW2) 42 shown in FIG. 1 is constituted by pin-junction diodes D3, D4, λ/4 transmission lines SL7, SL9, a capacitor C20 and a resistor R2. The switching of transmitting paths and receiving paths of DCS/PCS is conducted by ON/OFF of the control terminal VC2. The low-pass filter (LPF2) 46 shown in FIG. 1 is constituted by a transmission line SL8 and capacitors C16 to C18. A parallel resonance frequency of SL8 and C17 is set at about 2 to 3 times the transmission frequencies of DCS/PCS, resulting in the attenuation of harmonic distortion from a power amplifier connected to the transmission terminal of DCS/PCS.

The third switch (SW3) 43 shown in FIG. 1 corresponds to SW3 in FIG. 5. SW3 is constituted by a GaAs-FET switch. The fourth switch (SW4) 44 corresponds to SW4 in FIG. 5. SW4 is constituted by a GaAs-FET switch.

Figure 3:
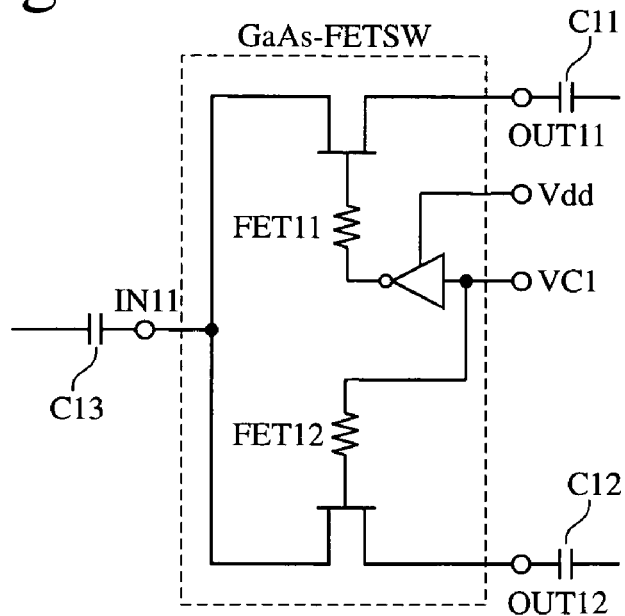
FIG. 3 is a block diagram showing one example of SPDT: GaAs-FET switch circuits.
Figure 4:
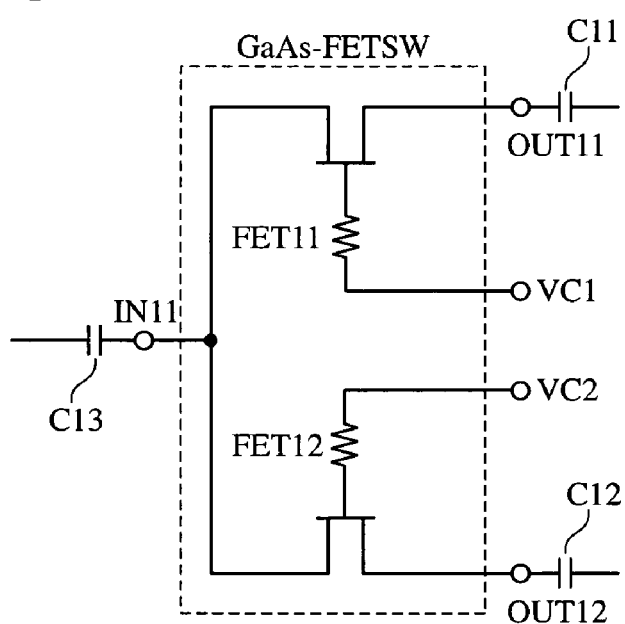
FIG. 4 is a block diagram showing another example of SPDT: GaAs-FET switch circuits.

Two types of GaAs-FET switches may be used. One is a GaAs-FET switch circuit shown in FIG. 3, which comprises one control terminal and one power terminal to conduct the switching of input and output. With an inverter for inverting ON/OFF in the GaAs-FET switch, input and output can be switched. Another one is a GaAs-FET switch circuit shown in FIG. 4, which switches input and output by two control terminals.

The DC-blocking capacitors 71 and 72 shown in FIG. 1 correspond to capacitors C25 and C21, respectively, in FIG. 5. Capacitors C5, C6, C11, C22, C23 and C19 shown in FIG. 5 are DC-blocking capacitors having infinite impedance to DC signals, thereby isolating the transmitting paths and the receiving paths from the DC signals, and stabilizing the operation of the antenna switch circuit.

The structure of the circuit shown in FIG. 5 will be further explained. In the transmission/receiving circuits of GSM850 and EGSM, a connection point P1 is connected to a connection point P2 via a transmission line SL1 and a capacitor C1, and a connection point of the transmission line SL1 and the capacitor C1 is grounded via a transmission line SL2 and a capacitor C2. The transmission line SL2 and the capacitor C2 constitutes a serial resonance circuit having a resonance frequency substantially equal to those of transmitting/receiving signals of DCS/PCS. The path is branched to the transmission circuit and the receiving circuit of GSM850 and EGSM by SW1 at the connection point P2.

The transmission circuit common to GSM850/EGSM is connected from the connection point P2 to a transmission terminal GSM850/EGSM-TX common to GSM850 and EGSM via a pin-junction diode D2, a parallel circuit of a transmission line SL4 and a capacitor C9, and a capacitor C11. The cathode of the pin-junction diode D2 is grounded via the capacitor C8, and the connection point of the transmission line SL4 and the capacitor C11 is grounded via a capacitor C10 or a transmission line SL5.

The receiving circuit of GSM850 is connected from the connection point P2 to a receiving terminal GSM850-RX for GSM850 via the transmission line SL3, a capacitor C25, a switch SW3, and a capacitor C5. The receiving circuit of EGSM is connected from the connection point P2 to a receiving terminal EGSM-RX for EGSM via the transmission line SL3, the capacitor C25, the switch SW3, and a capacitor C6. A control terminal VC1 for applying voltage for controlling the switching of the transmission/receiving of GSM850 and EGSM is connected to the connection point P3 via a resistor R1 and a pin-junction diode D1. A connection point of the anode of the pin-junction diode D1 and the resistor R1 is grounded via a capacitor C7.

The transmission/receiving circuits of DCS and PCS are connected from the connection point P1 to a connection point P4 via capacitors C12, C13. A connection point of the capacitor C12 and the capacitor C13 is grounded via a transmission line SL6 and a capacitor C14. The transmission line SL6 and the capacitor C14 constitute a serial resonance circuit having a resonance frequency substantially equal to the frequencies of the transmitting/receiving signals of GSM850/EGSM. The path is branched to transmission and receiving circuits of DCS and PCS at the connection point P4 by SW2.

A transmission circuit common to DCS and PCS is connected from the connection point P4 to a common transmission terminal DCS/PCS-TX of DCS/PCS via a pin-junction diode D4, a parallel circuit of a transmission line SL8 and a capacitor C17, and a capacitor C19. The pin-junction diode D4 is parallel-connected to a serial circuit of a capacitor C15 and an inductor L2. The impedance of the pin-junction diode D4 at OFF, the capacitor C15 and the inductor L2 constitute a serial resonance circuit having a resonance frequency substantially equal to the frequencies of transmitting/receiving signals of DCS/PCS. The cathode of the pin-junction diode D4 is grounded via a capacitor C16, and a connection point of a transmission line SL8 and a capacitor C19 is grounded via a capacitor C18 or a SL9.

The receiving circuit of DCS is connected from the connection point P4 to a receiving terminal DCS-RX of DCS via a transmission line SL7, a capacitor C21, a switch SW4, and a capacitor C22. The receiving circuit of PCS is connected from the connection point P4 to a receiving terminal PCS-RX of PCS via a transmission line SL7, a capacitor C21, a switch SW4, and capacitor C23.

A control terminal VC2 for controlling the switching of transmission/receiving in DCS and PCS is connected to a connection point P5 via a resistor R2 and a pin-junction diode D3. The connection point of the anode of the pin-junction diode D3 and the resistor R2 is grounded via a capacitor C20.

The third and fourth switches SW3, SW4 constituted by GaAs-FET are respectively connected to a common control terminal VC3 and a common power terminal Vdd. Voltage is always applied to the terminal Vdd, and the switches SW3 and SW4 share an electrode connected to Vdd. The same is true of the control terminal VC3. With a circuit structure simultaneously switching the switches SW3 and SW4, it is possible to share a power terminal and thus reduce the number of terminals. In place of Vdd, a control terminal VC4 may be used. In this case, too, with a circuit structure simultaneously switching the switches SW3 and SW4, it is possible to share a power terminal and thus reduce the number of terminals.

[4] Control and Operation of Antenna Switch Circuit

The control and operation of the antenna switch circuit will be explained, taking for example a first transmission system of GSM850/EGSM TX (transmission frequency: 824 to 915 MHz), a second transmission system of DCS/PCS TX (transmission frequency: 1710 to 1910 MHz), a first receiving system of GSM850 RX (receiving frequency: 869 to 894 MHz), a second receiving system of EGSM RX (receiving frequency: 925 to 960 MHz), a third receiving system of DCS RX (receiving frequency: 1805 to 1880 MHz), and a fourth receiving system of PCS RX (receiving frequency: 1930 to 1990 MHz). Explanation will be made below on a transmission mode of GSM850/EGSM, a receiving mode of GSM850, a receiving mode of EGSM, a transmission mode of DCS/PCS, a receiving mode of DCS and a receiving mode of PCS, referring to FIG. 5 and Table 1. Table 1 shows control voltage (always 2.6 V) applied to the control terminals VC1, VC2 and VC3 and the power terminal Vdd in FIG. 5 and consumed current.

TABLE 1

| Transmission/Receiving Mode | VC1 | VC2 | VC3 | Vdd | Current |
|---|---|---|---|---|---|
| GSM850/EGSM-TX | 2.6 V | 0 V | 2.6 V | 2.6 V | 8 mA |
| DCS/PCS-TX | 0 V | 2.6 V | 0 V | 2.6 V | 8 mA |
| GSM850-RX, PCS-RX | 0 V | 0 V | 0 V | 2.6 V | 0.2 mA |
| EGSM-RX, DCS-RX | 0 V | 0 V | 2.6 V | 2.6 V | 0.2 mA |

(A) Transmission mode of GSM850/EGSM

The operation of the circuit will be explained in the transmission mode of GSM850/EGSM, in which 2.6 V is applied to the control terminals VC1 and VC3, and no voltage is applied to the control terminal VC2. The pin-junction diodes D1, D2 are turned on, while the pin-junction diodes D3, D4 are turned off. While the pin-junction diode D2 is in an ON state, impedance is low between the GSM850/EGSM transmission terminal and the connection point P2. Though the pin-junction diode D1 is also in an ON state, impedance is almost short at the connection point P3 at a GSM850/EGSM transmission frequency, because the capacitance of the capacitor C7 is controlled such that the parasitic inductance of the diode D1 and the capacitor C7 constitutes a serial resonance circuit at a GSM850/EGSM transmission frequency. In this case, impedance is almost open at a high frequency when the receiving terminal of GSM850 and the receiving terminal of EGSM are viewed from the connection point P2, because the length of the transmission line SL3 is set to almost $\lambda/4$ of the electrical length at a GSM850/EGSM transmission frequency. Thus, a transmission signal input from the GSM850/EGSM transmission terminal is sent to the diplexer circuit Dip without leaking to the receiving paths of GSM850/EGSM.

The GaAs-FET switch SW3 is switched to the receiving terminal of EGSM at this time, because the frequency of the transmission signal of EGSM (880 to 915 MHz) overlaps the receiving frequency of GSM850 (869 to 894 MHz). When SW3 is connected to the receiving terminal of EGSM, a signal at the overlapped frequency (880 to 894 MHz) is attenuated by a SAW filter connected to the EGSM receiving terminal. When SW3 is connected to the receiving terminal of GSM850, a signal at the overlapped frequency is not attenuated by the SAW filter connected to the GSM850 receiving terminal because the receiving passband of GSM850 is 869 to 894 MHz, thereby affecting the operation of mobile phones.

Figure 16:
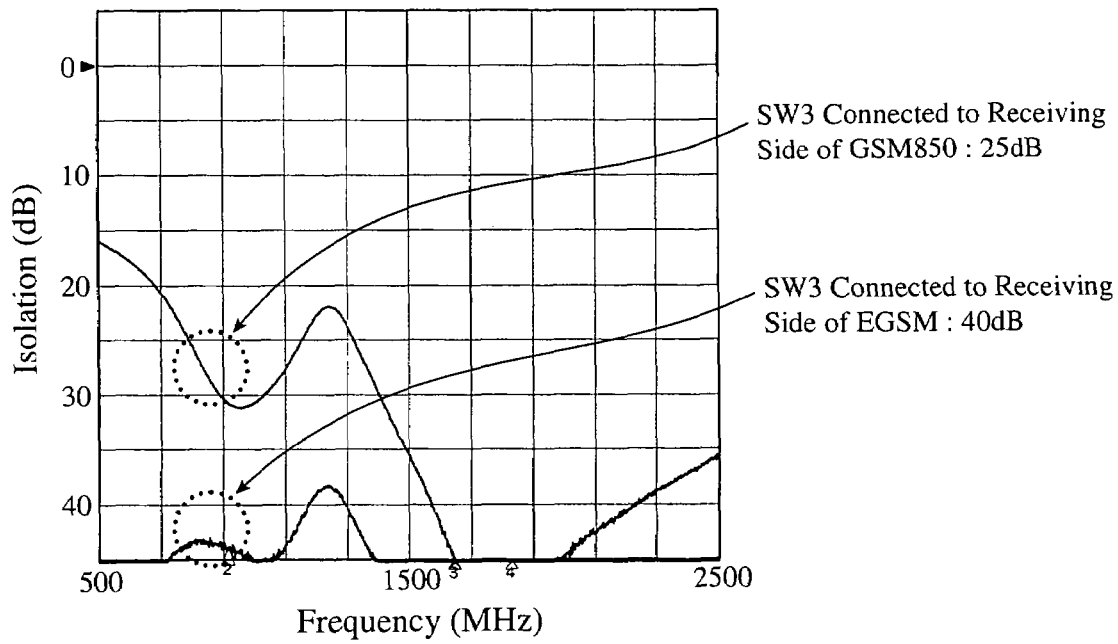
FIG. 16 is a graph showing isolation between a GSM850/EGSM transmitting path and a GSM850 receiving path.

FIG. 16 shows the improvement of isolation between GSM850/EGSM transmission and GSM850 receiving. Though the isolation is about 25 dB when SW3 is connected to the receiving side of GSM850, it is improved to 40 dB by connecting SW3 to the receiving side of EGSM. Because isolation is about 25 dB between the GSM850/EGSM transmission terminal and the EGSM receiving terminal, there is no likelihood of the breakdown of the SAW filter due to the intrusion of a transmission signal. There is also sufficient isolation between the DCS receiving terminal, the PCS receiving terminal and the DCS/PCS transmission terminal, because of full attenuation by the diplexer circuit. Thus, a GSM850/EGSM transmission signal is emitted from the antenna terminal ANT without leaking to the other paths.

(B) DCS/PCS transmission mode

The operation of the circuit will be explained in a DCS/PCS transmission mode. 2.6 V is applied to the control terminal VC2 at this time, while no voltage is applied to the control terminals VC1 and VC3. The pin-junction diodes D3, D4 are thus turned on, while the pin-junction diodes D1, D2 are turned off. Impedance is low between the DCS/PCS transmission terminal and the connection point P4 when the pin-junction diode D4 is in an ON state. Though the pin-junction diode D3 is also turned on, impedance is almost short at the connection point P5 at a DCS/PCS transmission frequency, because the capacitance of the capacitor C20 is controlled such that the parasite inductance of the diode D3 and the capacitor C20 constitute a serial resonance circuit at a DCS/PCS transmission frequency. In this case, impedance is almost open at a high frequency when the receiving terminals of DCS and PCS are viewed from the connection point P4, because the length of the transmission line SL7 is set to almost λ/4 of the electrical length at a DCS/PCS transmission frequency. Thus, a transmission signal input from the DCS/PCS transmission terminal is sent to the diplexer circuit Dip without leaking to the receiving paths of DCS/PCS.

Figure 17:
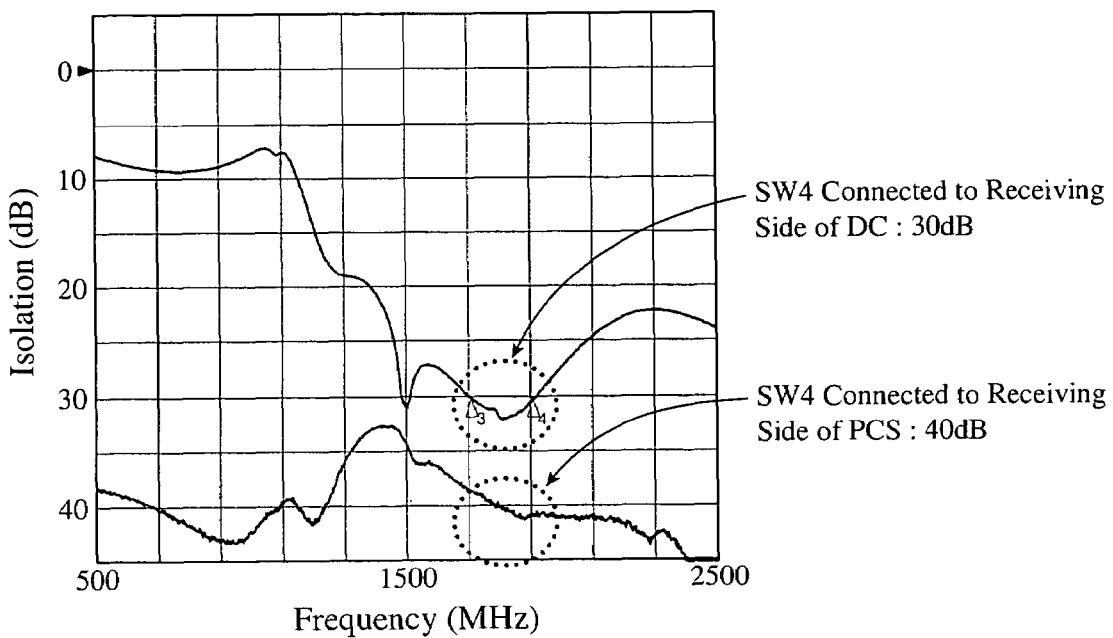
FIG. 17 is a graph showing isolation between a DCS/PCS transmitting path and a DCS receiving path.
Figure 18:
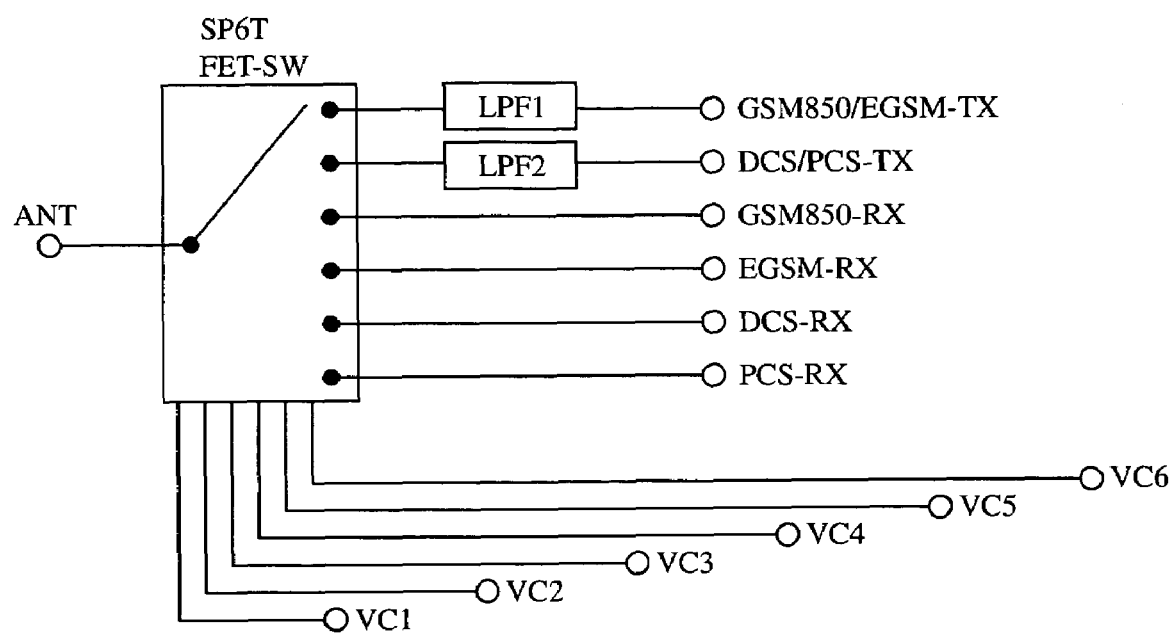
FIG. 18 is a block diagram showing a conventional SP6T:GaAs-FET switch circuit.

The GaAs-FET switch SW4 is switched to the PCS receiving terminal at this time, because the frequency of the PCS transmission signal (1850 to 1910 MHz) overlaps the receiving frequency of DCS (1805 to 1880 MHz). When SW4 is connected to the PCS receiving terminal, a signal at the overlapped frequency (1850 to 1880 MHz) is attenuated by the SAW filter connected to the PCS receiving terminal. When SW4 is connected to the DCS receiving terminal, a signal at the overlapped frequency is not attenuated by the SAW filter connected to the DCS receiving terminal because of a DCS receiving passband of 1805 to 1880 MHz, thereby affecting the operation of mobile phones. FIG. 17 shows the improvement of isolation between DCS/PCS transmission and DCS receiving. When SW4 is connected to the receiving side of DCS, the isolation is about 30 dB. However, the isolation is improved to 40 dB by connecting SW4 to the receiving side of PCS. Because the isolation between DCS/PCS transmission and PCS receiving is about 25 dB, there is no likelihood of the breakdown of the SAW filter due to the intrusion of the transmission signal. There is also sufficient isolation between the GSM850 receiving terminal, the EGSM receiving terminal and the GSM850/EGSM transmission terminal, because of sufficient attenuation by the diplexer circuit. Thus, the DCS/PCS transmission signal is emitted from the antenna terminal ANT without leaking to the other paths.

With the above structure and operation control of the switch circuits in this embodiment, isolation from transmission to receiving in the transmission mode can be drastically improved.

(C) GSM850 receiving mode, PCS receiving mode

The operation of the circuit in a GSM850 receiving mode and a PCS receiving mode will be explained. At this time, no voltage is applied to any control terminals VC1, VC2, VC3. Because the control voltage VC1, VC2 applied to the pin-junction diode switches SW1, SW2 is 0 V, all pin-junction diodes D1 to D4 are in an OFF state, whereby the diplexer is connected to the input terminals of SW3 and SW4, respectively. The voltage of VC3 is branched by a node N1 and passes through SW3 and SW4, and the voltage of Vdd is branched by a node N2 and passes through SW3 and SW4. At this time, the input terminal of the GaAs-FET switch SW3 is connected to the receiving path of GSM850, and the input terminal of the GaAs-FET switch SW4 is connected to the receiving path of PCS. The diplexer substantially prevents a GSM850 receiving signal from leaking to the PCS receiving terminal, and a PCS receiving signal from leaking to the GSM850 receiving terminal. As a result, the antenna terminal is connected to the receiving terminal of GSM850 in a GSM850 receiving signal band, and the antenna terminal is connected to the PCS receiving terminal in a PCS receiving signal band.

(D) EGSM receiving mode, DCS receiving mode

The operation of the circuit in an EGSM receiving mode and a DCS receiving mode will be explained. At this time, 2.6 V is applied to the control terminal VC3, while no voltage is applied to the control terminals VC1, VC2. Because the control voltages VC1, VC2 applied to the pin-junction diode switches SW1, SW2 is 0 V, all pin-junction diodes D1 to D4 are in an OFF state, whereby the diplexer is connected to the input terminals of SW3 and SW4, respectively. The voltage of VC3 is branched by a node N1 and passes through SW3 and SW4, and the voltage of Vdd is branched by a node N2 and passes through SW3 and SW4. At this time, the input terminal of the GaAs-FET switch SW3 is connected to the receiving path of EGSM, and the input terminal of the GaAs-FET switch SW4 is connected to the DCS receiving path. The diplexer substantially prevents an EGSM receiving signal from leaking to the DCS receiving terminal, and a DCS receiving signal from leaking to the EGSM receiving. As a result, the antenna terminal is connected to the EGSM receiving terminal in an EGSM receiving signal band, and the antenna terminal is connected to the DCS receiving terminal in a DCS receiving signal band.

[5] Connection of Control Terminals

Figure 6:
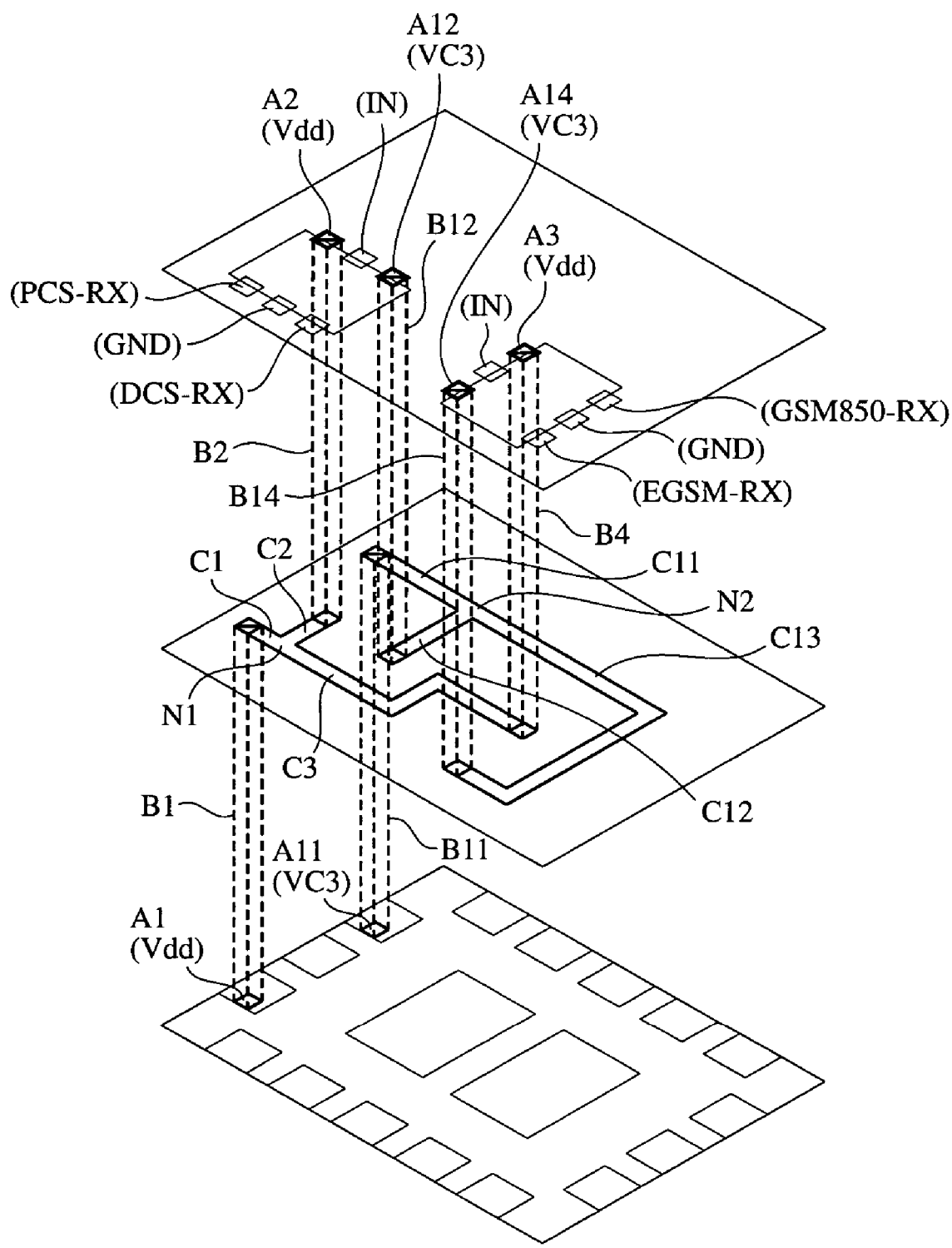
FIG. 6 is an exploded perspective view showing one example of the wiring pattern of control terminals in the antenna switch module of the present invention.

FIG. 6 schematically shows the connection of Vdd and VC3 in a laminate. An external terminal A1 of Vdd is connected to a via-hole B1 and a line C1, and branched at a node N1 to lines C2 and C3. The line C2 passes through a via-hole B2 and connected to an electrode terminal A2 on an upper surface, which is connected to the terminal Vdd of the GaAs-FET switch SW3. The line C3 passes through a via-hole B4 and connected to an electrode terminal A3 on the upper surface, which is connected to the terminal Vdd of the GaAs-FET switch SW4.

The external terminal A11 of VC3 is connected to a via-hole B11 and a line C11, and branched at a node N2 to lines C12 and C13. The line C12 passes through a via-hole B12 and connected to an electrode terminal A12 on the upper surface, which is connected to the terminal VC3 of the GaAs-FET switch SW3. The line C13 passes through a via-hole B14 and connected to an electrode terminal A14 on the upper surface, which is connected to the terminal VC3 of the GaAs-FET switch SW4.

The above laminate structure makes it possible to control and operate the antenna switch circuit in this embodiment.

In this embodiment, the power supplies VC3 and Vdd are connected to the GaAs-FET switch, such that GSM850 receiving and PCS receiving, and EGSM receiving and DCS receiving, respectively are simultaneously permitted. This is effective mainly in the U.S., where a GSM850 band and a PCS band are used, and mainly in Europe and Asia, where an EGSM band and a DCS band are used. Thus, the connection of VC3 and Vdd in this embodiment does not necessitate the switching of receiving modes in the same service area, thereby making the antenna switch module more useful.

(A) Another example of connection of control terminals

Figure 7:
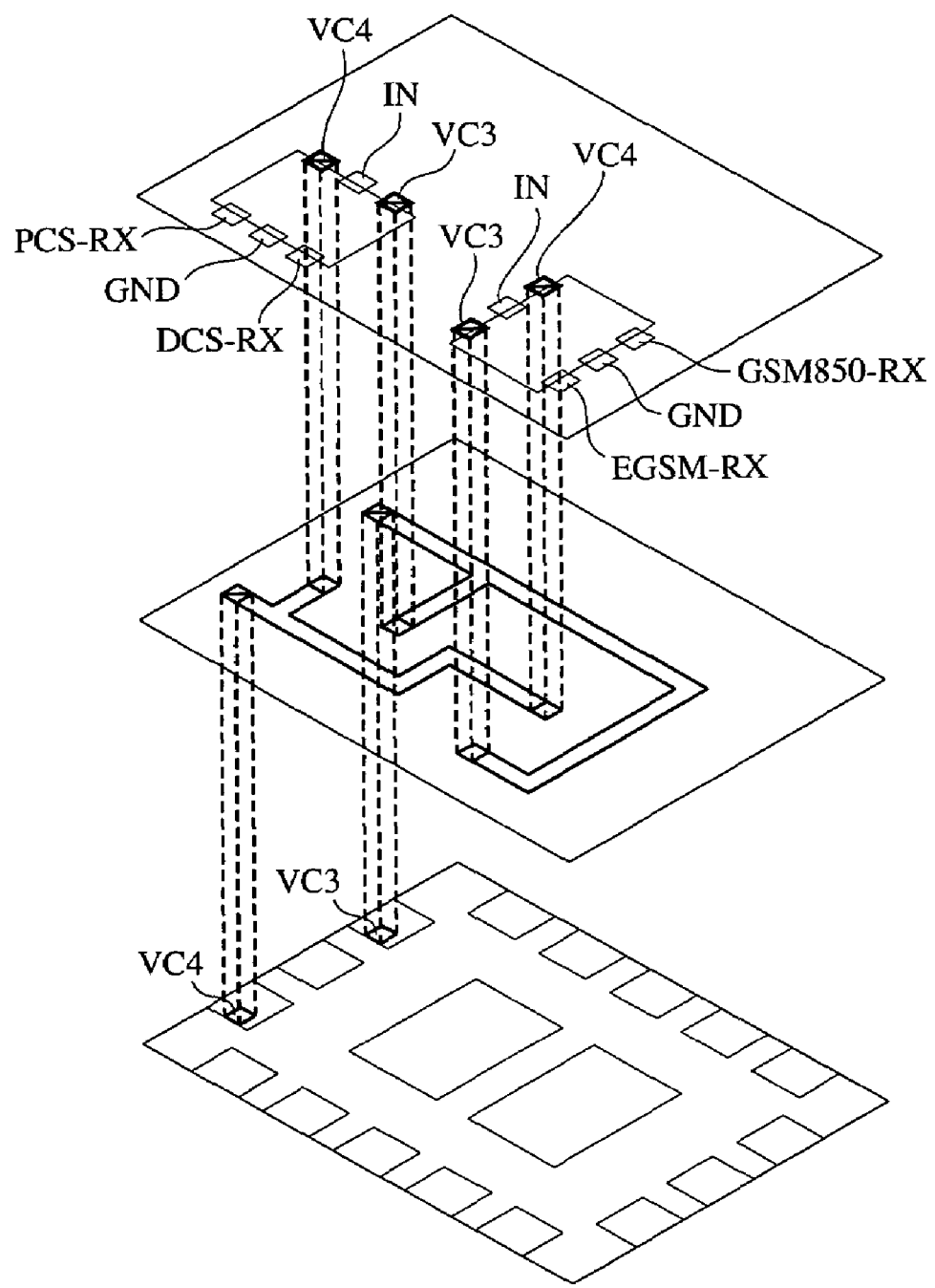
FIG. 7 is an exploded perspective view showing another example of the wiring pattern of control terminals in the antenna switch module of the present invention.

FIG. 7 and Table 2 show another example of the connection of the antenna switch circuit to the control terminals and its operation.

TABLE 2

| Transmission/<br>Receiving Mode | VC1 | VC2 | VC3 | VC4 | Current |
|---|---|---|---|---|---|
| GSM850/EGSM-TX | 2.6 V | 0 V | 2.6 V | 0 V | 8 mA |
| DCS/PCS-TX | 0 V | 2.6 V | 0 V | 2.6 V | 8 mA |
| GSM850-RX, PCS-RX | 0 V | 0 V | 0 V | 2.6 V | 5 µA |
| EGSM-RX, DCS-RX | 0 V | 0 V | 2.6 V | 0 V | 5 µA |

In this case, VC3 and VC4 are used to control the GaAs-FET switch. Though this structure uses one more control terminal, an inverter circuit need not be contained in the GaAs-FET switch, thereby reducing the cost of the GaAs-FET switch and thus the cost of the antenna switch module.

Because the laminate structure of FIG. 7 is the same as that of FIG. 6, the explanation of its details is omitted, except for the difference from FIG. 6 that using a GaAs-SW of a two-power supply control terminal type, current consumed at the time of receiving can be reduced to 5 μA, about one-tenth of the conventional level.

Figure 8:
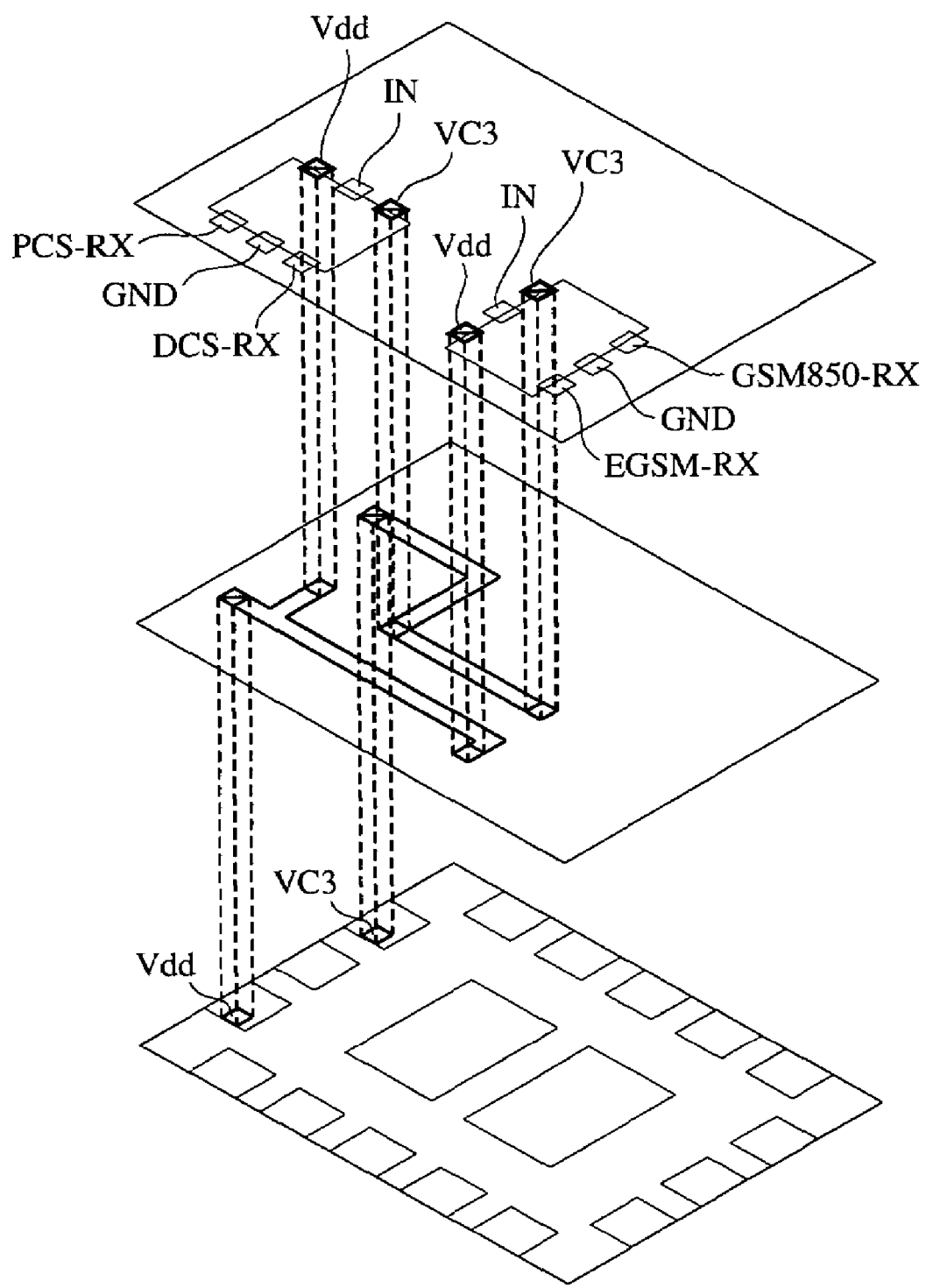
FIG. 8 is an exploded perspective view showing a further example of the wiring pattern of control terminals in the antenna switch module of the present invention.

FIG. 8 and Table 3 show a further example of the connection of the control terminals in the antenna switch circuit and its operation.

TABLE 3

| Transmission/Receiving Mode | VC1 | VC2 | VC3 | Vdd | Current |
|---|---|---|---|---|---|
| GSM850/EGSM-TX | 2.6 V | 0 V | 2.6 V | 2.6 V | 8 mA |
| DCS/PCS-TX | 0 V | 2.6 V | 2.6 V | 2.6 V | 8 mA |
| GSM850-RX, DCS-RX | 0 V | 0 V | 0 V | 2.6 V | 0.2 mA |
| EGSM-RX, PCS-RX | 0 V | 0 V | 2.6 V | 2.6 V | 0.2 mA |

In this case, the power supplies VC3 and Vdd are connected to control the GaAs-FET switch, such that a GSM850 receiving and a DCS receiving, and an EGSM receiving and a PCS receiving, respectively are simultaneously permitted. This control logic can easily be changed by modifying the power supply transmission lines in the laminate of FIG. 7 as shown in FIG. 8, without affecting other RF transmission lines.

Figure 9:
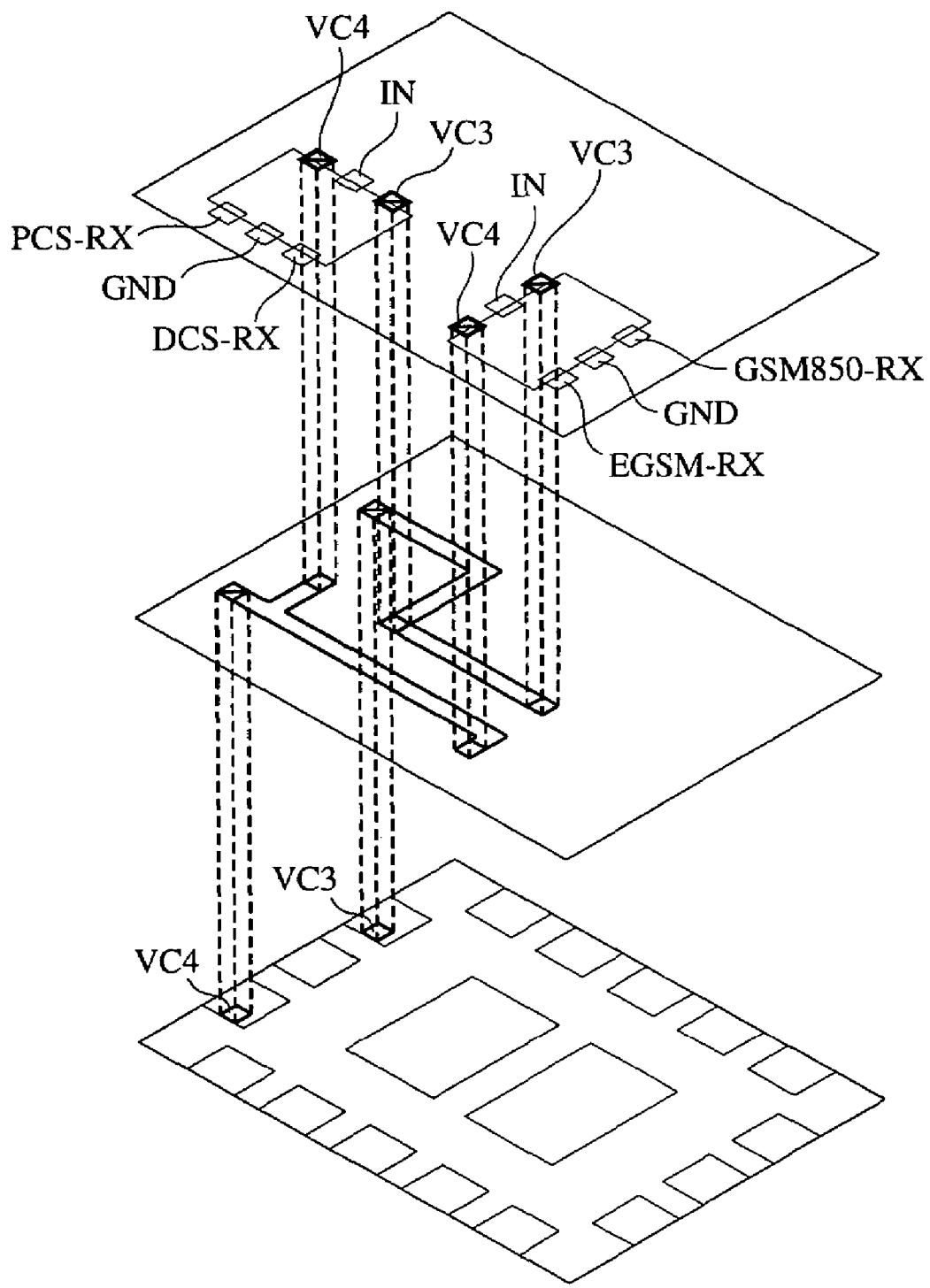
FIG. 9 is an exploded perspective view showing a still further example of the wiring pattern of control terminals in the antenna switch module of the present invention.

FIG. 9 and Table 4 show a still further example of the connection of the control terminals in the antenna switch circuit and its operation.

TABLE 4

| Transmission/Receiving Mode | VC1 | VC2 | VC3 | VC4 | Current |
|---|---|---|---|---|---|
| GSM850/EGSM-TX | 2.6 V | 0 V | 0 V | 2.6 V | 8 mA |
| DCS/PCS-TX | 0 V | 2.6 V | 0 V | 2.6 V | 8 mA |
| GSM850-RX, DCS-RX | 0 V | 0 V | 2.6 V | 0 V | 5 μA |
| EGSM-RX, PCS-RX | 0 V | 0 V | 0 V | 2.6 V | 5 μA |

In this case, the power supplies VC3 and VC4 are connected to control the GaAs-FET switch, such that a GSM850 receiving and a DCS receiving, and an EGSM receiving and a PCS receiving, respectively are simultaneously permitted. This control logic can easily be changed by modifying the power supply transmission lines in the laminate of FIG. 7 as shown in FIG. 9, without affecting other RF transmission lines.

[6] Example of Triple-Band Antenna Switch Circuit

Figure 2:
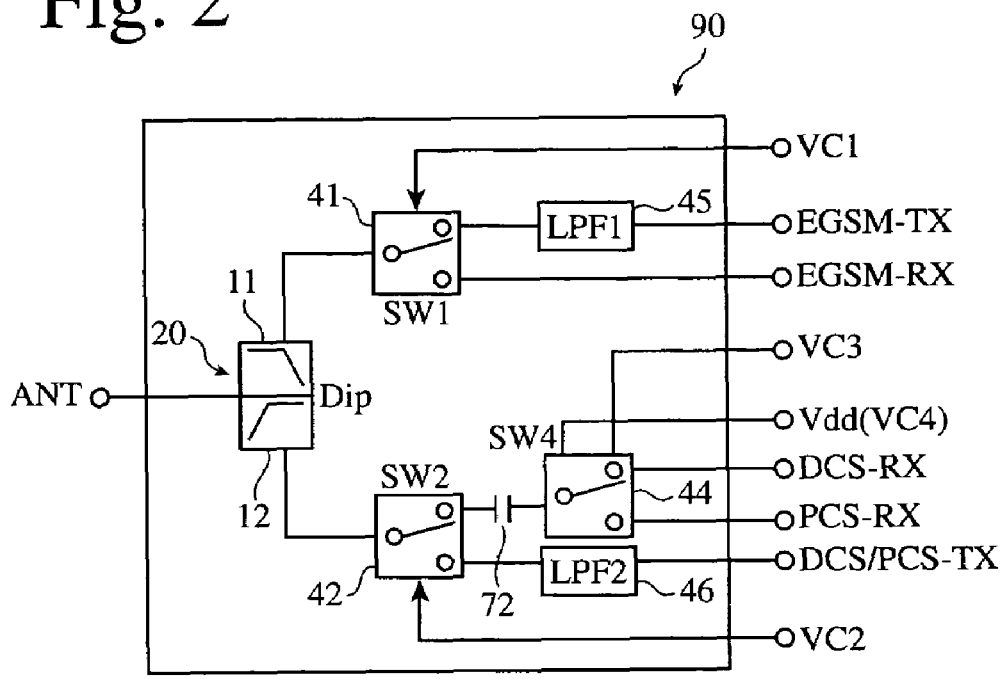
FIG. 2 is a block diagram showing the antenna switch circuit according to another embodiment of the present invention.

FIG. 2 is a block diagram showing a triple-band antenna switch circuit according to a still further embodiment of the present invention. FIG. 2 shows a circuit equivalent to that of FIG. 1 except that the switch SW3 for switching lower-frequency receiving is omitted. Accordingly, the number of bands that can be handled is three, such as EGSM (or GSM850), DCS and PCS. In this case, the switching of EGSM transmission and EGSM receiving are conducted by the switch SW1 comprising pin-junction diodes, the switching of DCS/PCS transmission and DCS/PCS receiving are conducted by the switch SW2 comprising pin-junction diodes, and the switching of DCS receiving and PCS receiving are conducted by the GaAs-FET switch SW4, respectively by the ON/OFF control of the control terminals VC1, VC2, VC3. The antenna switch circuit of this embodiment can reduce current consumed at the time of receiving in DCS or PCS, and can make a module size smaller because of using a small GaAs-FET switch, as compared with a conventional antenna switch circuit having a switch comprising pin-junction diodes for switching DCS receiving and PCS receiving.

[7] Example of Measures for Electrostatic Discharge

Figure 10:
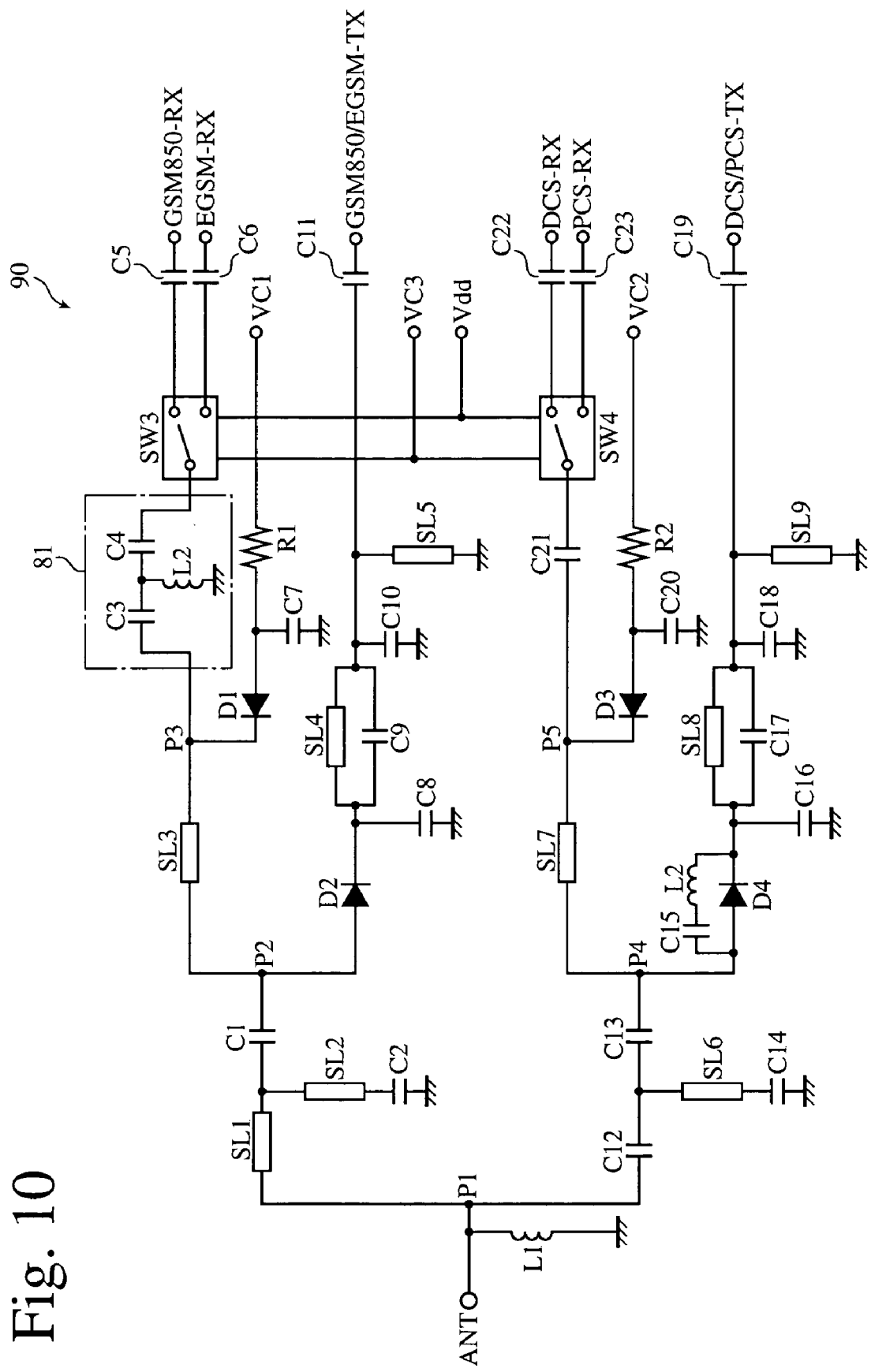
FIG. 10 is a view showing an equivalent circuit of the antenna switch circuit according to another embodiment of the present invention.

FIG. 10 shows an antenna switch circuit having electrostatic discharge (ESD) measures in the circuit shown in FIG. 5. A T-type high-pass filter 81 for attenuating low-frequency components of an ESD discharge waveform is constituted by capacitors C3, C4 and an inductor L2. Because its other portions are the same as in FIG. 5, their explanation will be omitted.

Figure 11:
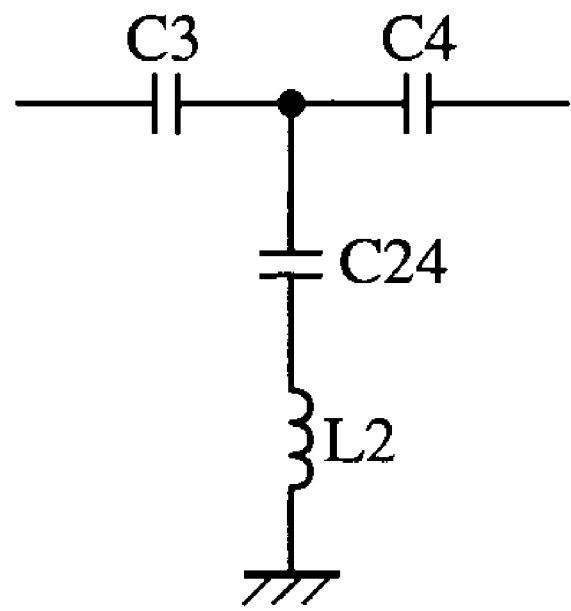
FIG. 11 is a view showing one example of high-pass filters used in the antenna switch circuit of the present invention for protection from ESD.

Though the GaAs-FET switch generally has low breakdown voltage, the inclusion of the high-pass filter 81 surely prevents electrostatic breakdown. Because a transmitting/receiving module comprising a high-frequency circuit board has terminal electrodes exposed outside, a surge voltage may be applied from outside through the terminal electrodes. The high-pass filter 81 is effective to block the surge voltage. The T-type high-pass filter 81 need not be positioned as shown in FIG. 10, but may be placed at any position in the circuit, if necessary. According to simulation, the capacitors C3, C4 are preferably 10 pF or less, and the inductor L2 is preferably 30 nH or less. The T-type high-pass filter 81 is advantageous in the easiness of disposing in the laminate because of relatively small capacitance of C3 and C4. As another high-pass filter, the notch filter comprising an inductor L2 and a capacitor C24 shown in FIG. 11 may be added. In this case, by adjusting the resonance frequency of the inductor L2 and the capacitor C24 to 100 to 500 MHz, ESD surge can be drastically reduced.

[8] Other Effects

The important feature of the present invention is that voltage applied to every control terminal may be 2.6 V, needing only one common power supply. This makes its control easy and reduces the number of terminals in the module.

Voltage applied to the control terminals is conventionally as high as 3 V, as shown in FIG. 2 of EP 1265370. This is not preferable because of increased current consumption in mobile phones. In addition, the conventional circuit needs a large operation margin when the battery voltage of mobile phones is lowered. In these respects, too, the antenna switch circuit of the present invention is advantageous over the conventional ones. Further, current at the time of a receiving mode is 0.2 mA as shown in Table 1, much smaller than a driving current of 1 to 10 mA in the conventional pin-junction diode switches. This is a great advantage for mobile phones, etc. that should receive power supply from small batteries.

[9] Antenna Switch Module

Figure 12:
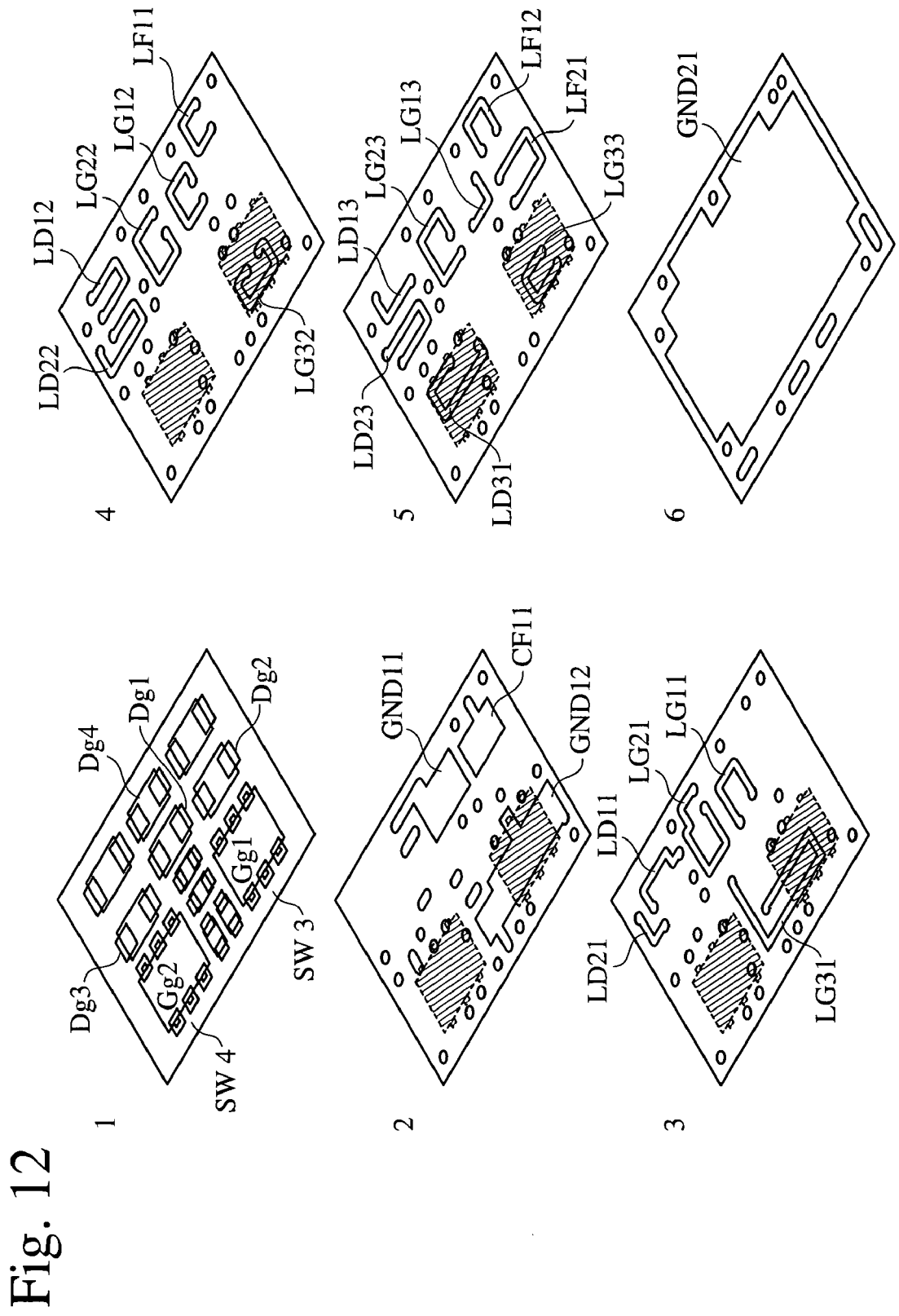
FIG. 12 is a developed view showing main layers in the multilayer substrate of the antenna switch module of the present invention.

An antenna switch module having a laminate structure comprising the antenna switch circuit of the present invention will be explained. A laminate according to one embodiment, which comprises the antenna switch circuit shown in FIG. 5, has a size of 5.4 mm×4.0 mm (so-called 5440 type) and a height of at most 1.5 mm. FIG. 12 is a development view showing electrode patterns and parts on some laminate sheets in a multilayer substrate constituting the antenna switch module.

LC circuits constituting the diplexer, and transmission lines and capacitors for constituting the first and second switch circuits SW1, SW2 are formed by electrode patterns in the laminate, and pin-junction diodes, switching elements of the GaAs-FET switch, and chip elements such as high-capacitance capacitors, resistors, etc., which cannot be contained in the laminate, are mounted onto the upper surface of the multilayer substrate, to constitute a multiband antenna switch module.

The multilayer substrate may be made of dielectric ceramic materials (LTCC) co-fireable at as low temperatures as about 900° C. as described below. LTCC is preferably formed into green sheets each having a thickness of 40 to 200 μm, printed with an Ag-based conductive paste to desired electrode patterns having, for instance, line electrodes for transmission lines as wide as 100 to 400 μm, and proper through-hole electrodes. Each green sheet with the desired electrode pattern is laminated, press-bonded and sintered to provide the antenna switch module.

A preferred example of the low-temperature co-fired ceramic materials has a composition comprising 10 to 60% by mass of aluminum oxide (as $Al_2O_3$), 25 to 60% by mass of silicon oxide (as $SiO_2$), 7.5 to 50% by mass of strontium oxide (as SrO), and 20% by mass or less of titanium oxide (as $TiO_2$) as main components. Based on the total (100% by mass) of the main components, it may further contain at least one selected from the group consisting of Bi, Na, K and Co as additional components, preferably 0.1 to 10% by mass of Bi (as $Bi_2O_3$), 0.1 to 5% by mass of Na (as $Na_2O$), 0.1 to 5% by mass of K (as $K_2O$), and 0.1 to 5% by mass of Co (as CoO). It may further contain at least one selected from the group consisting of Cu, Mn and Ag, preferably 0.01 to 5% by mass of Cu (as CuO), 0.01 to 5% by mass of Mn (as $MnO_2$), and 0.01 to 5% by mass of Ag, with inevitable impurities. Such low-temperature co-fired ceramic materials do not preferably contain Pb and B.

The composition of the preferred low-temperature co-fired ceramic materials is, for instance, 48% by mass of Al (as $Al_2O_3$), 38% by mass of Si (as $SiO_2$), 10% by mass of Sr (as SrO) and 4% by mass of Ti (as $TiO_2$) as main components, and 2.5% by mass of Bi (as $Bi_2O_3$), 2% by mass Na (as $Na_2O$), 0.5% by mass of K (as $K_2O$), 0.3% by mass of Cu (as CuO) and 0.5% by mass of Mn (as $MnO_2$), based on 100% by mass of the main components, as additional components.

[10] Arrangement of Electrodes on Laminate Substrates

The arrangement of the FET switch elements mounted onto the substrate and the electrode patterns in the laminate will be explained. FIG. 12 shows a first layer (uppermost layer), a second layer, a third layer, a fourth layer, a fifth layer, and a sixth layer in this order from above, which are part of the antenna switch module.

Mounted onto the upper surface of the multilayer substrate are pin-junction diodes Dg1, Dg2, Dg3, Dg4, GaAs-FET switches SW3, SW4, and other chip elements. The diode switch preferably has good distortion characteristics at the time of power input with a low cost. The GaAs-FET switch preferably has small current consumed in an ON state, and the laminate can be made smaller with the GaAs-FET switch than with the diode switch.

Each layer will be explained below. Hatched portions in the figure show the shadow of the GaAs-FET switches SW3, SW4 mounted onto the upper surface of the laminate projected on each substrate in a lamination direction, clarifying the positions of SW3, SW4.

The second layer has ground electrodes GND11, GND12 and the electrode CF11 of the diplexer. The ground electrode GND12 and the GaAs-FET switch SW3 mounted onto the upper surface of the laminate overlap each other when viewed from above in a lamination direction. With the ground electrode formed below the GaAs-FET switch, signals leaking from the GaAs-FET switch and signals leaking from other paths are absorbed by the ground electrode GND12 without interference from each other, thereby reducing the interference of the GaAs-FET switch and the other paths. Though this embodiment has a ground electrode below the GaAs-FET switch SW3, it is also preferable to form a ground electrode below the GaAs-FET switch SW4, not as an indispensable structure.

The third layer is printed with electrode patterns of LG11 and LD11, and LG21 and LD21, which are part of transmission lines SL4, SL8, SL5, SL9 on the transmission side of GSM850/EGSM and DCS/PCS. It is also printed with LG31, part of the λ/4 transmission line SL3 on the receiving side of GSM850 and EGSM. As shown in FIG. 12, part of the transmission line LG31 is arranged substantially just below the GaAs-FET switch SW3 mounted onto the upper surface, and the electrode patterns of the transmission lines LG11, LD11, LG21, LD21 on the transmission side are arranged in vacant areas surrounding them. As a result, electrode patterns for constituting paths on the transmission side are distant from the GaAs-FET switch conducting the switching of receiving, thereby suppressing interference between a path on the GSM850/EGSM transmission side and paths on the receiving side of GSM850 and EGSM.

Like the third layer, the fourth layer is printed with electrode patterns LF11, LG12, LD12, LG22 and LD22, which are part of the transmission lines SL1, SL4, SL8, SL5, SL9 on the transmission sides of GSM850/EGSM and DCS/PCS. Like the third layer, an electrode pattern LG32 constituting the λ/4 transmission line SL3 is arranged substantially just below the GaAs-FET switch SW3, and the electrode patterns of the transmission lines LG12, LD12, LG22, LD22 on the transmission side are arranged in vacant areas, thereby suppressing interference between a transmission-side path of GSM850/EGSM and receiving-side paths of EGSM and GSM850.

The fifth layer is printed with electrode patterns LF12, LF21, LG13, LD13, LG23, LD23, which are part of transmission lines SL1, SL2, SL4, SL8, SL5, SL9 on the transmission sides of GSM850/EGSM and DCS/PCS. It also has LG33 and LD31, part of the λ/4 transmission lines SL3, SL7 on the receiving side. With the transmission line LG33 arranged substantially just below the GaAs-FET switch SW3, the interference of the transmission-side path of GSM850/EGSM and the receiving-side paths of EGSM and GSM850 can be suppressed for the same reasons as above. Similarly, with the transmission line LD31 arranged substantially just below the GaAs-FET switch SW4, the interference of the transmission-side path of DCS/PCS and the receiving-side paths of DCS and PCS can be suppressed. Incidentally, LF11 and LF12 form the transmission line SL1 in the diplexer Dip, and LF21 forms the transmission line SL2 in the diplexer Dip.

The sixth layer is a ceramic sheet substantially completely covered with a ground electrode GND21. With this structure, the antenna switch module of the present invention is not easily affected by an ambient environment when mounted onto resin substrates of mobile phones. Mutual interference between the terminals is also reduced.

Figure 13:
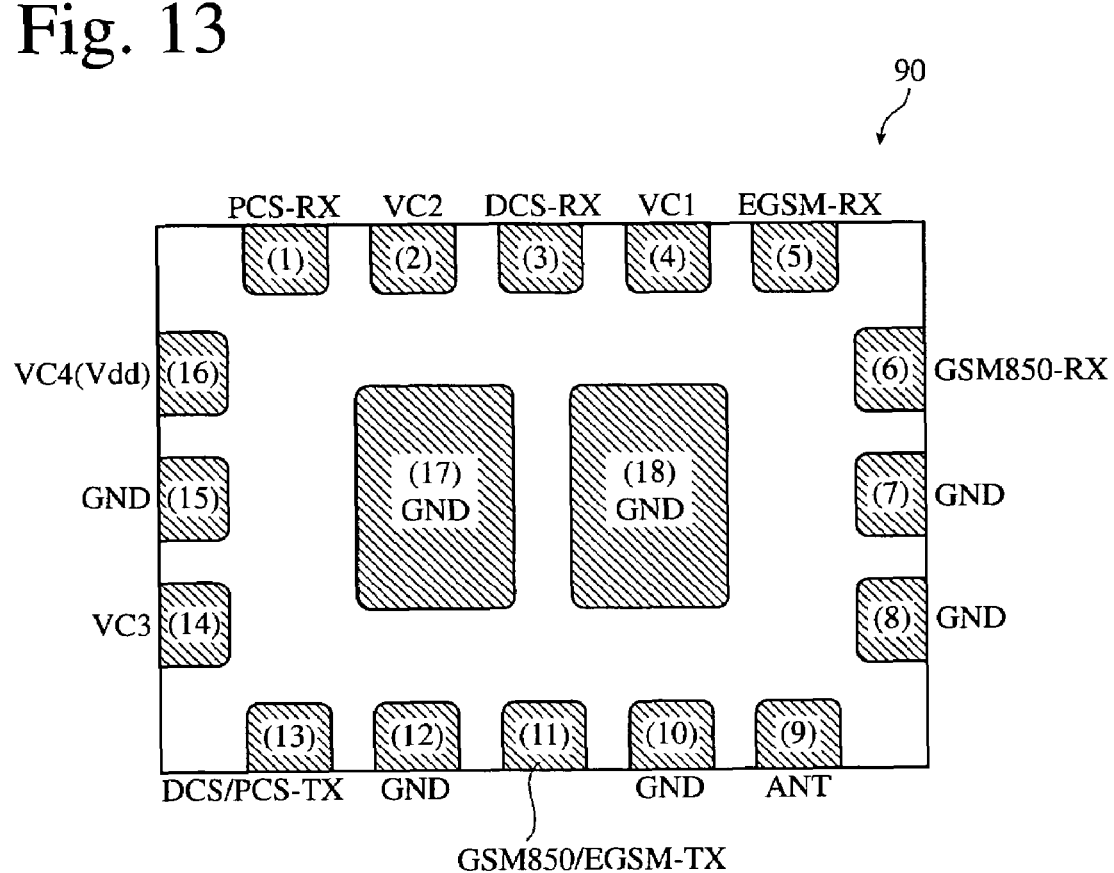
FIG. 13 is a bottom view showing the arrangement of electrodes in the antenna switch module of the present invention.

FIG. 13 shows the arrangement of electrodes shown in FIG. 5 when viewed from the bottom.

The antenna switch module of the present invention has a control power supply common to the GaAs-FET switches (SW3, SW4) 43, 44, resulting in two terminals; a control terminal VC3 and a power terminal Vdd. Considering that one GaAs-FET switch inherently needs two control terminals, the present invention reduces the number of terminals by 2. The present invention thus makes it easy for users designing and producing mobile gears such as cell phones comprising antenna switch modules to design and produce their circuits.

As is clear from FIG. 13, seven electrodes 7, 8, 10, 12, 15, 17, 18 serve as ground electrodes (GND). If the GND potential of the antenna switch module were not completely grounded, the deterioration of isolation and the malfunction of semiconductor elements would be likely to occur. Accordingly, the existence of many GND electrodes together with large central ground electrodes 17,18 greatly contributes to the stabilization of operation.

[11] Test Results

FIGS. 14(a) to (c) show various characteristics of the antenna switch module having the laminate structure shown in FIG. 12 in a transmission mode of GSM850/EGSM. The measurement of the characteristics was conducted by a network analyzer, with the electrodes 2, 4, 14, 16 (corresponding to VC2, VC1, VC3 and Vdd, respectively) grounded via a noise-removing capacitor of 100 pF, and with DC-blocking capacitors of 100 pF connected in series to the electrodes 1, 3, 5, 6, 11, 13 (corresponding to PCS-RX, DCS-RX, EGSM-RX, GSM850-RX, GSM850/EGSM-TX and DCS/PCS-TX terminals, respectively) on an evaluation substrate.

FIG. 14(a) shows insertion loss (dB) characteristics that indicate how much an input signal is attenuated when exiting from the antenna switch circuit, FIG. 14(b) shows impedance characteristics in a Smith chart, and FIG. 14(c) shows return loss characteristics. As is clear from FIG. 14(a), the antenna switch module of the present invention has as low insertion loss as 1.2 dB.

As is clear from FIG. 14(b), the antenna switch circuit of the present invention has good impedance characteristics. Using a Smith chart, the change of impedance expressed by a complex number, and the conversion of admittance, a return loss, a voltage standing wave ratio (VSWR), etc. can be easily calculated.

As is clear from FIG. 14(c), the antenna switch circuit of the present invention has VSWR of 1.3 or less, on the same level of conventional antenna switch circuits or better. VSWR is a ratio of power reflected by an antenna to power input into the antenna. Smaller VSWR means that power is more efficiently supplied to the antenna.

Figure 14:
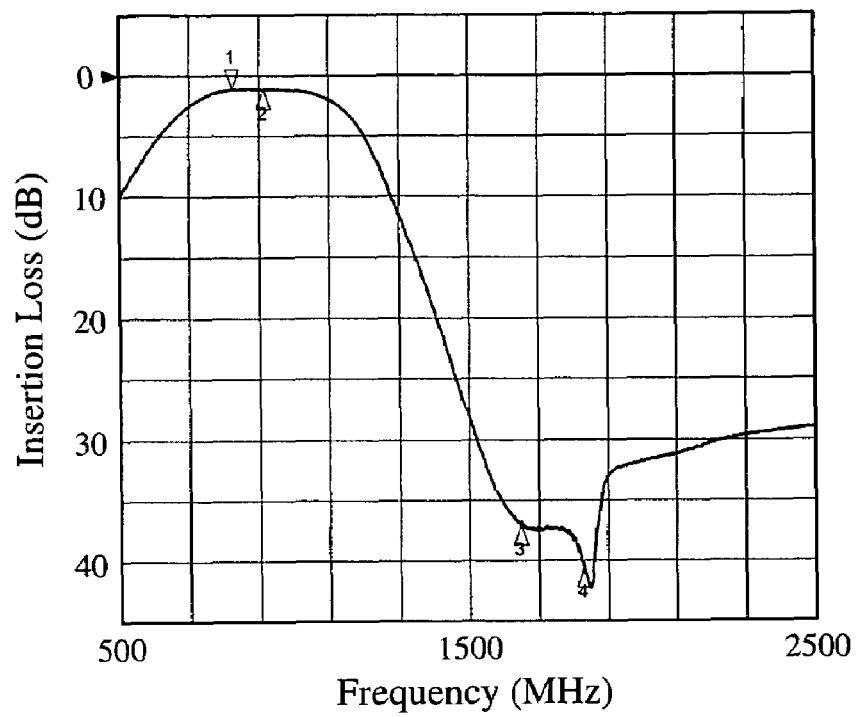
FIG. 14(a) is a graph showing the relation between insertion loss and frequency in the antenna switch circuit of the present invention.
FIG. 14(b) is a Smith chart showing the characteristics of the antenna switch circuit of the present invention.
FIG. 14(c) is a graph showing the return loss characteristics of the antenna switch circuit of the present invention.
Figure 14:
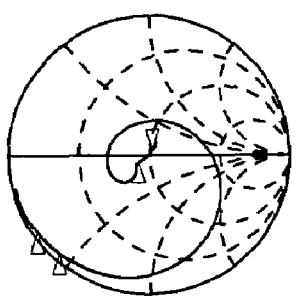
Figure 14:
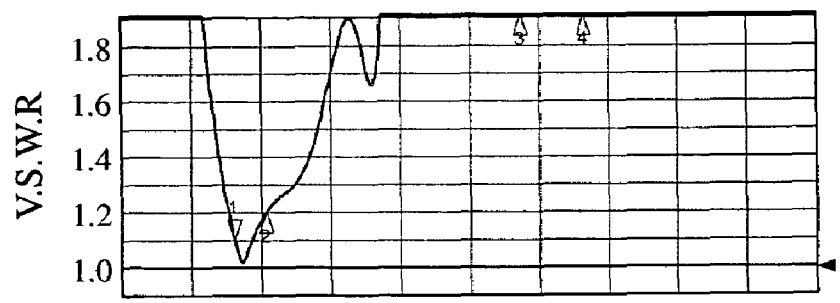

Though only the characteristics of GSM850/EGSM in a transmission mode are shown in FIG. 14, the antenna switch module of the present invention exhibited good insertion loss, impedance characteristics in a Smith chart and return loss characteristics in transmitting/receiving modes in other bands.

Figure 15A:
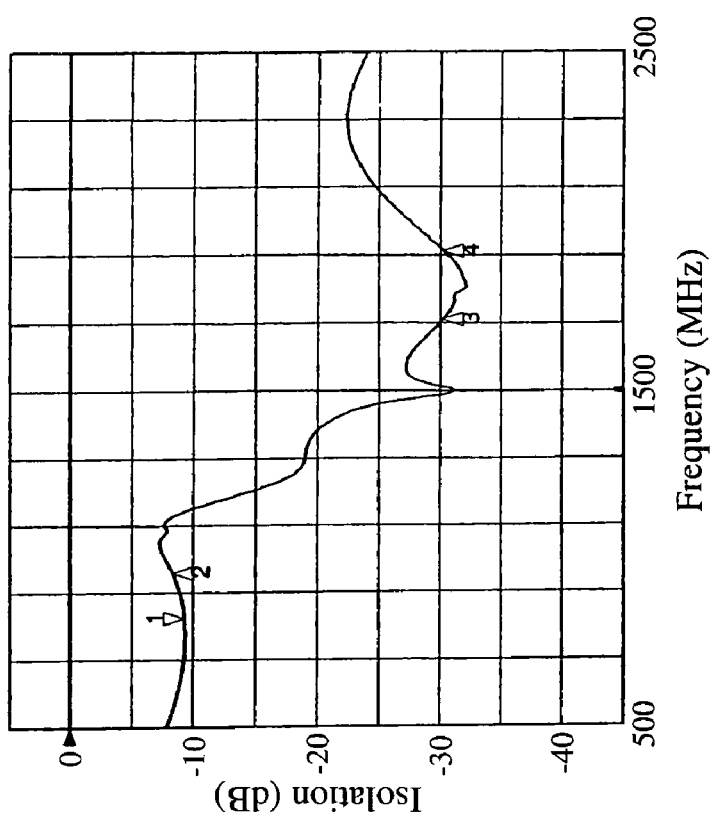
FIG. 15(a) is a graph showing isolation between a DCS/PCS transmitting path and a PCS receiving path in an antenna switch module of the present invention, in which an electrode pattern constituting a transmitting path of DCS/PCS receiving-side path is not arranged substantially just below a GaAs-FET switch.
Figure 15B:
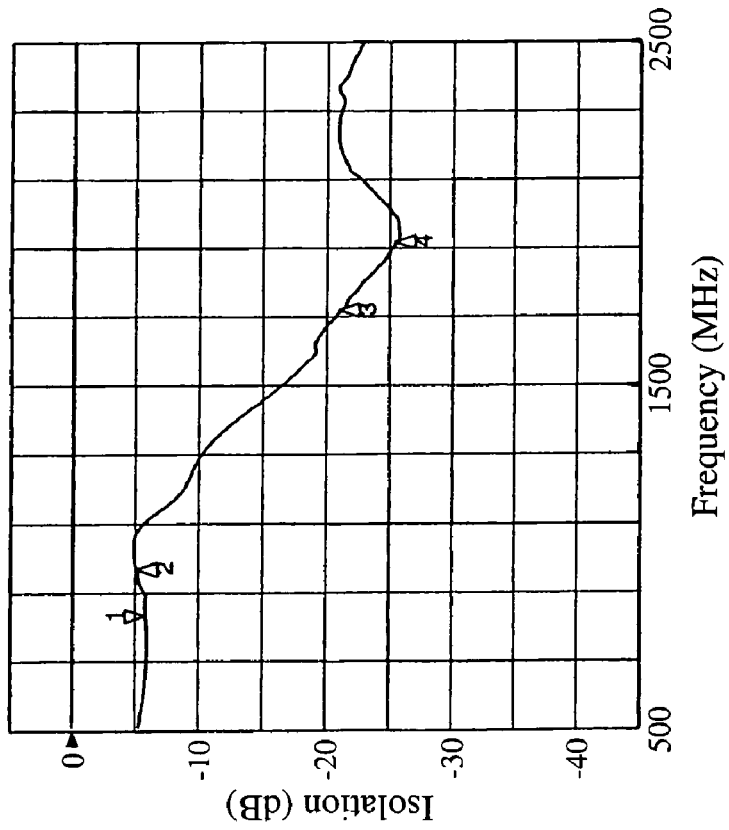
FIG. 15(b) is a graph showing isolation between a DCS/PCS transmitting path and a PCS receiving path in the antenna switch module of the present invention, in which an electrode pattern constituting a transmitting path of DCS/PCS receiving-side path is arranged substantially just below a GaAs-FET switch.

FIG. 15 shows the comparison of isolation between transmission and receiving. FIG. 15(a) indicates a case where the electrode pattern LD31 constituting the transmission line SL7 of DCS/PCS receiving-side path was not arranged substantially just below the GaAs-FET switch SW4, and FIG. 15(b) indicates a case where the electrode pattern LD31 was arranged substantially just below the GaAs-FET switch SW4 as in the above embodiment of the present invention (FIG. 12). The transmission frequency in a DCS/PCS band is 1710 to 1910 MHz. The isolation was at most 20 dB in this band in FIG. 15(a), while it was drastically improved to 30 dB in the present invention shown in FIG. 15(b). The improvement of isolation was accompanied by improvement in the insertion loss of a transmission signal by 0.1 dB.

The pin-junction diode used in the present invention may be a diode having a pin junction comprising a high-resistivity layer (intrinsic layer: true semiconductor layer) sandwiched by a P region and an N region, which is not restricted to a Si-semiconductor diode but may be a semiconductor diode of other materials. Though GaAs-FET is used for SW3 and SW4 in this embodiment, AlGaAs, SiGe, CMOS, etc. may also be used. As long as SW3 and SW4 are FET devices, their materials and production processes, etc. are not restrictive.

The small antenna switch module of the present invention having the above construction is excellent in harmonic distortion and isolation with small current consumption and a small number of control terminals.

What is claimed is:

1. An antenna switch circuit connected to a common antenna for switching the connection of said antenna to a transmission circuit or a receiving circuit in plural transmitting/receiving systems having different passbands, comprising
   a diplexer circuit comprising a low-pass filter and a high-pass filter;
   a first switch circuit connected to said low-pass filter and comprising pin-junction diodes, transmission lines and at least one capacitor for switching a transmitting line and a receiving line;
   a second switch circuit connected to said high-pass filter and comprising pin-junction diodes, transmission lines and at least one capacitor for switching a transmitting line and a receiving line;
   a third switch circuit comprising FET switches connected to said first switch circuit for switching said receiving line from said first switch circuit; and
   a fourth switch circuit comprising FET switches connected to said second switch circuit for switching said receiving line from said second switch circuit,
   wherein said third and fourth switch circuits share a control power terminal.

2. The antenna switch circuit according to claim 1, comprising capacitors between said first switch circuit and said third switch circuit, and between said second switch circuit and said fourth switch circuit.

3. The antenna switch circuit according to claim 2, wherein said capacitors have an electrostatic capacitance of 5 pF or more.

4. The antenna switch circuit according to claim 1, wherein a high-pass filter is disposed between said first and third switch circuits and/or between said second and fourth switch circuits.

5. The antenna switch circuit according to claim 1, wherein said first switch circuit switches said transmitting line and said receiving line of GSM850 and EGSM; said second switch circuit switches said transmitting line and said receiving line of DCS and PCS; said third switch circuit switches a receiving line of GSM850 and a receiving line of EGSM; said fourth switch circuit switches a receiving line of DCS and a receiving line of PCS; said third switch circuit is connected to said receiving line of EGSM at the time of transmission of GSM850 and EGSM; and said fourth switch circuit is connected to said receiving line of PCS at the time of transmission of DCS and PCS.

6. A communications device comprising the antenna switch circuit according to claim 1.

7. An antenna switch module connected to a common antenna for switching the connection of said antenna to a transmission circuit or a receiving circuit in plural transmitting/receiving systems having different passbands, comprising
- a diplexer circuit comprising a low-pass filler and a high-pass filler each constituted by an LC circuit;
- a first switch circuit connected to said low-pass filter and comprising pin-junction diodes and transmission lines for switching a transmitting line and a receiving line,
- a second switch circuit connected to said high-pass filter and comprising pin-junction diodes and transmission lines for switching a transmitting line and a receiving line;
- a third switch circuit comprising FET switches connected to said first switch circuit for switching said receiving line from said first switch circuit; and
- a fourth switch circuit comprising FET switches connected to said second switch circuit for switching said receiving line from said second switch circuit;
- at least part of transmission lines constituting said LC circuits in said diplexer circuit and said first and second switch circuits being electrode patterns formed in a multilayer substrate constituted by plural dielectric layers; and chip elements constituting part of said LC circuits, diode elements constituting said first and second switch circuits, and FET switches constituting said third and fourth switch circuits being mounted onto said multilayer substrates,
- wherein FET switches constituting said third switch circuit and/or said fourth switch circuit overlap at least part of electrode patterns constituting said transmission lines on the side of the receiving line of said first or second switch circuit, when said multilayer substrate is viewed from above its mount surface in a lamination direction.

8. The antenna switch module according to claim 7, wherein a layer having a ground electrode is disposed between layers having said semiconductor elements and electrode patterns constituting transmission lines on the side of said receiving lines.

9. The antenna switch module according to claim 7, wherein low-pass filter circuits constituted by LC circuits formed by electrode patterns in said multilayer substrate are disposed in said first and second switch circuits on the side of said transmitting lines.

10. The antenna switch module according to claim 7, wherein a high-pass filter constituted by an LC circuit formed by an electrode pattern in said multilayer substrate is disposed between said first and third switch circuits and/or between said second and fourth switch circuits.

11. A communications device comprising the antenna switch module according to claim 7.

* * * * *